A. RHENSTROM AND O. H. WATKINS.
WIRE LINK FABRIC MACHINE.
APPLICATION FILED APR. 6, 1917.
1,424,379.
Patented Aug. 1, 1922.
23 SHEETS—SHEET 20.
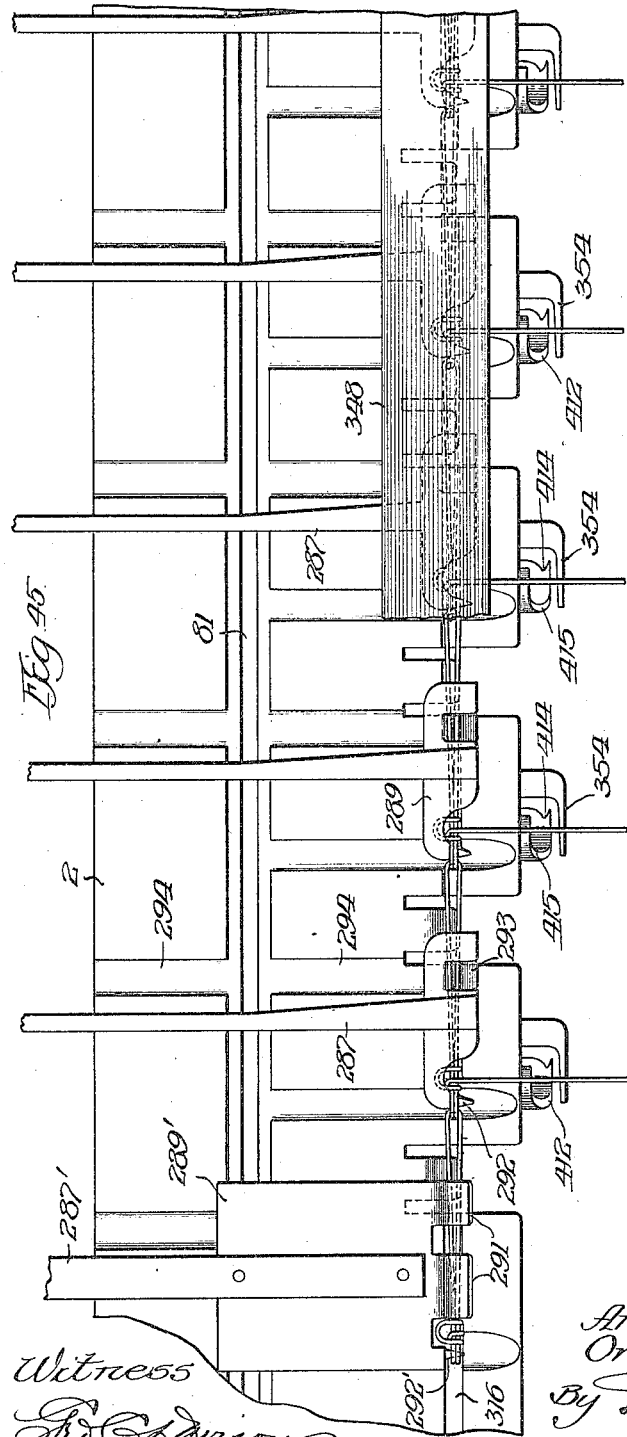
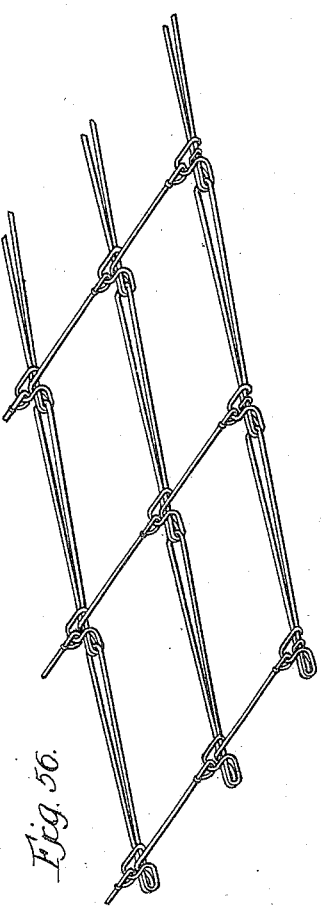
Inventors
Anthony Rhenstrom
Orla H. Watkins
By Pond + Wilson
Attys
Witness

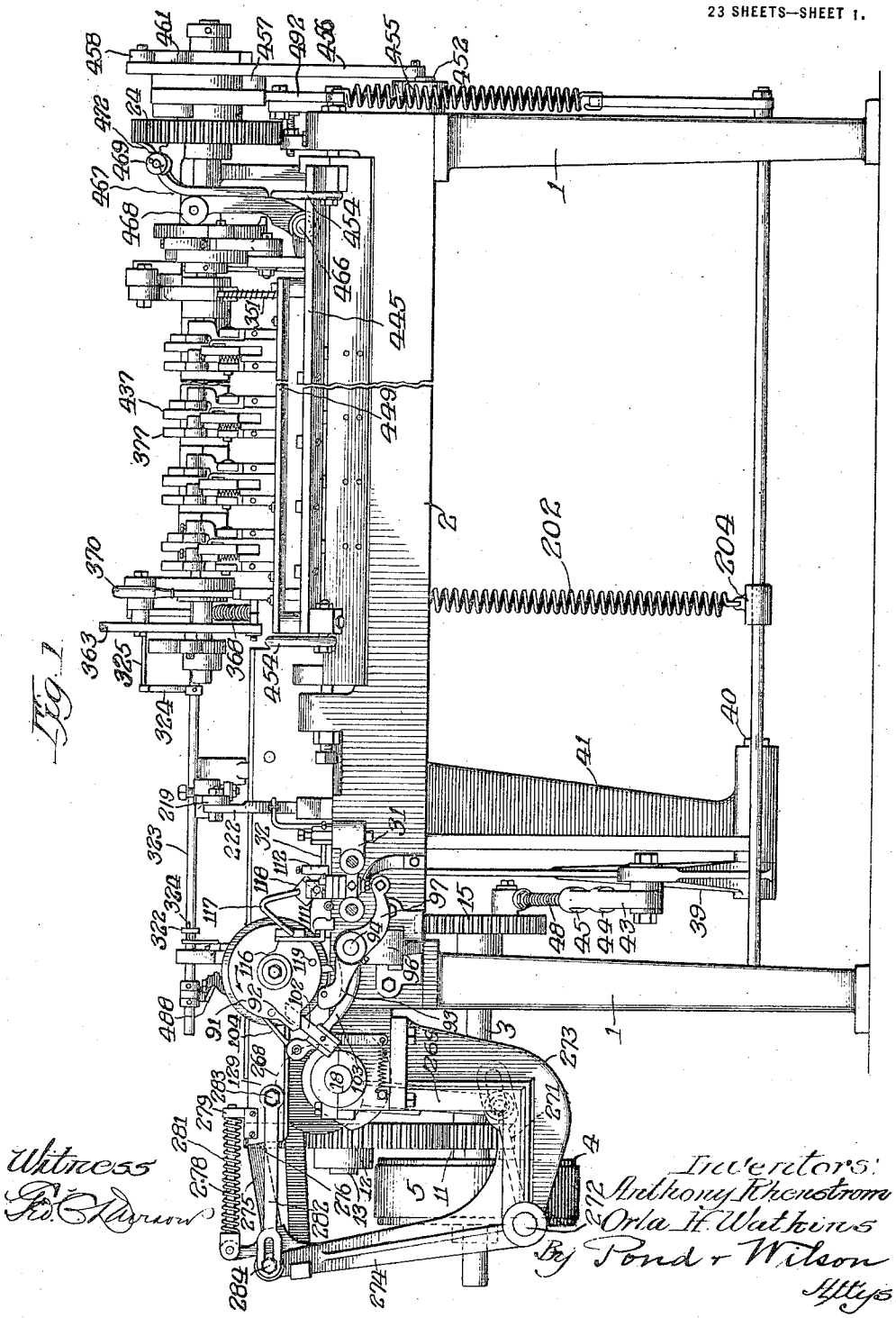

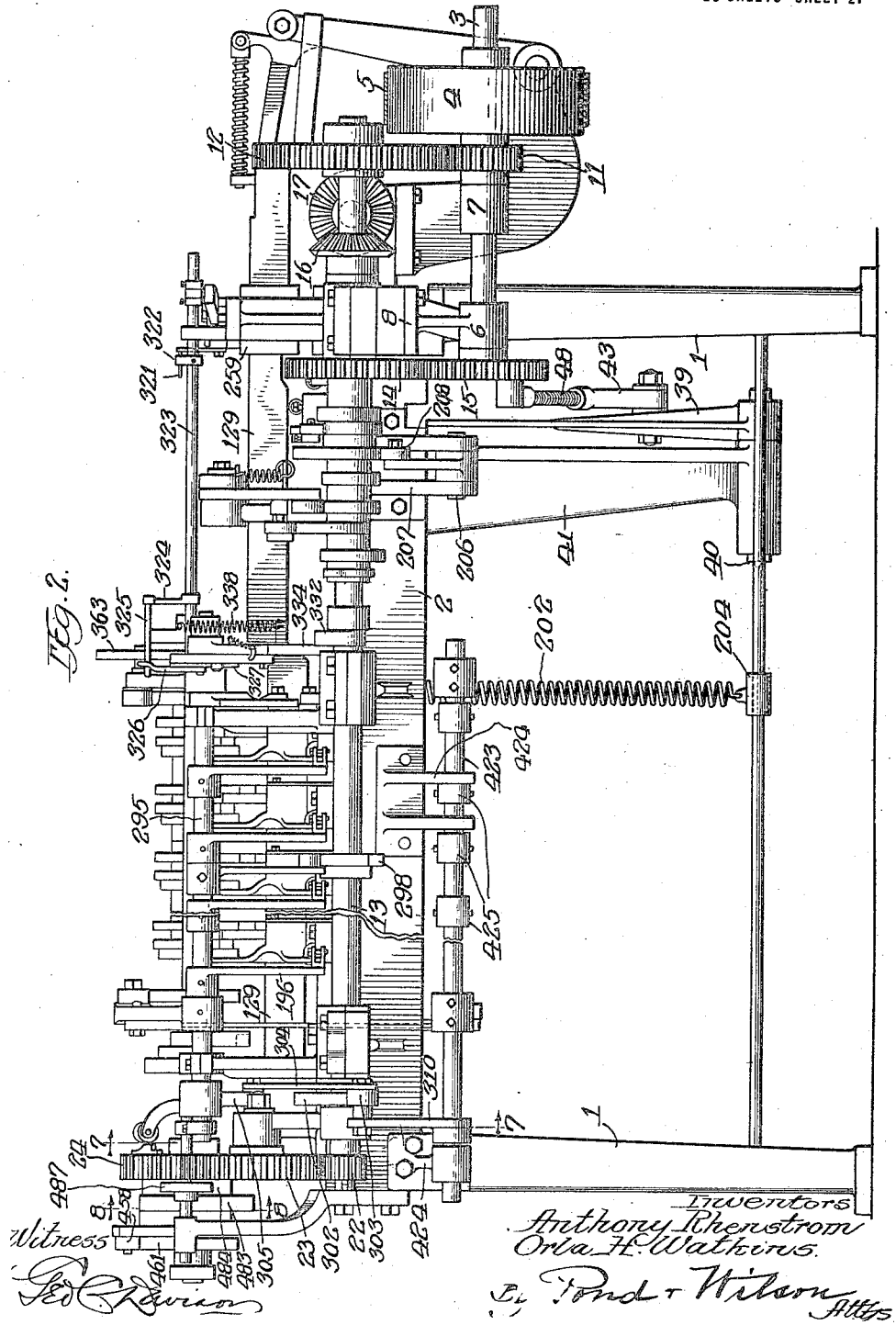

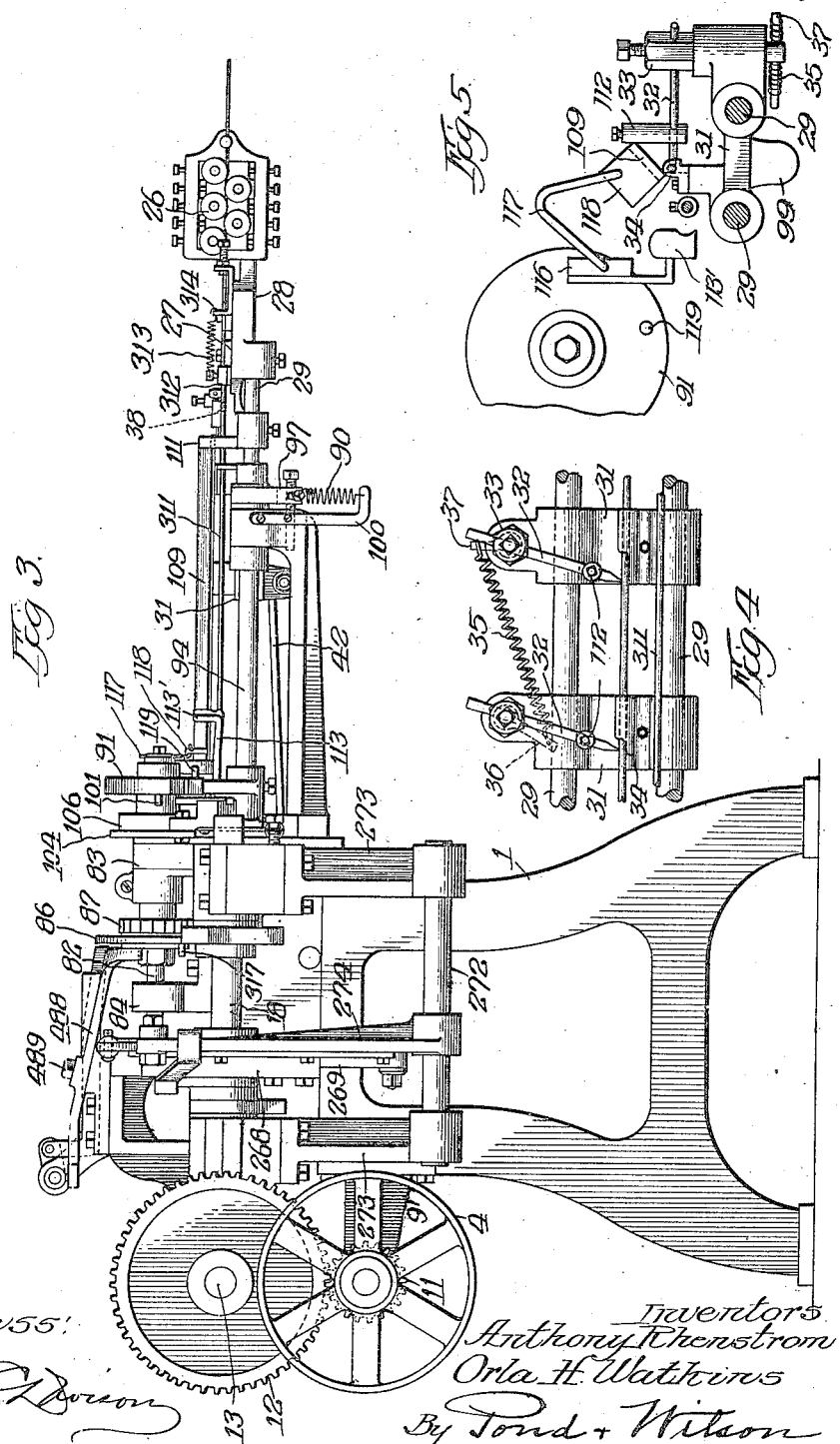

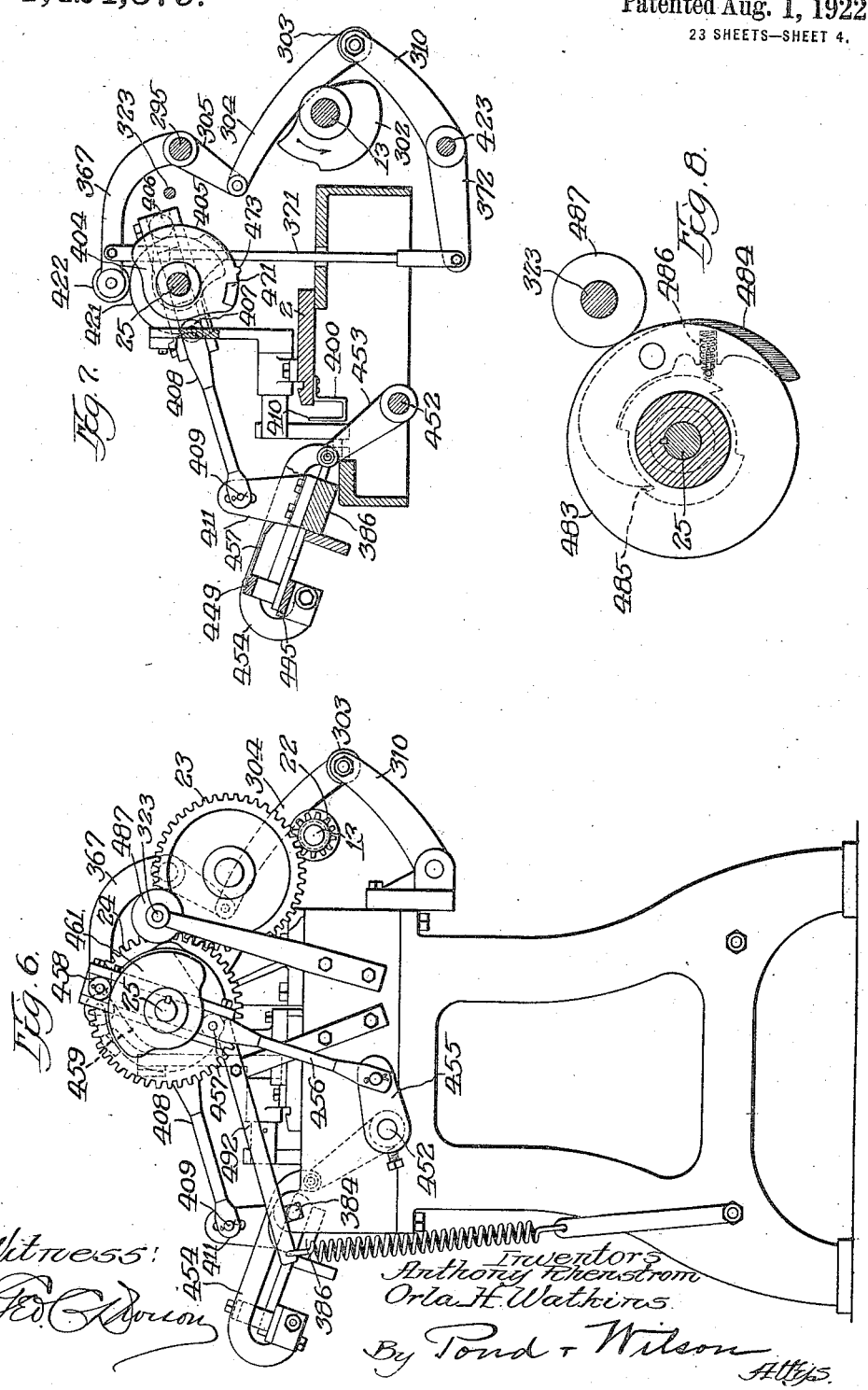

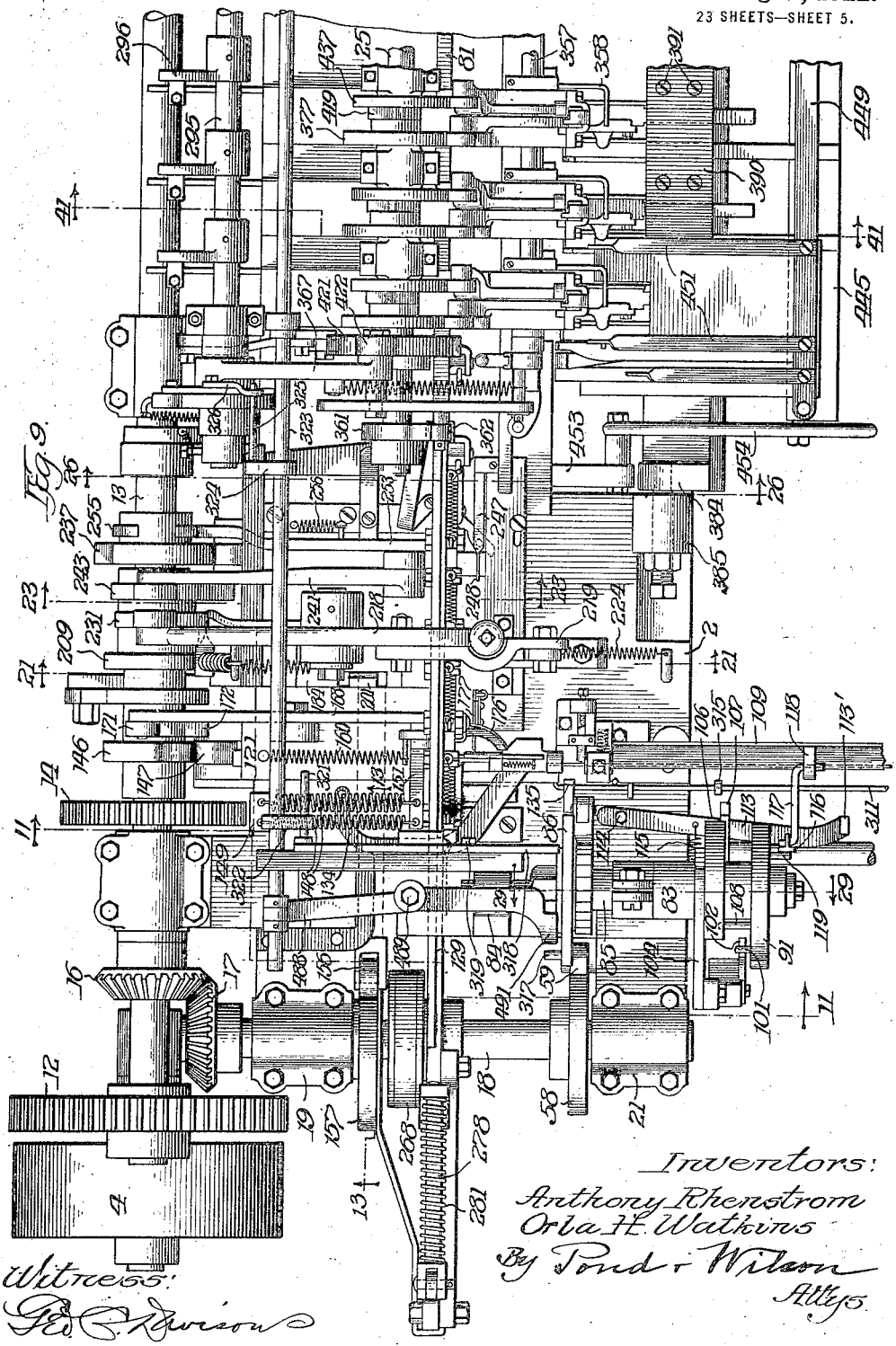

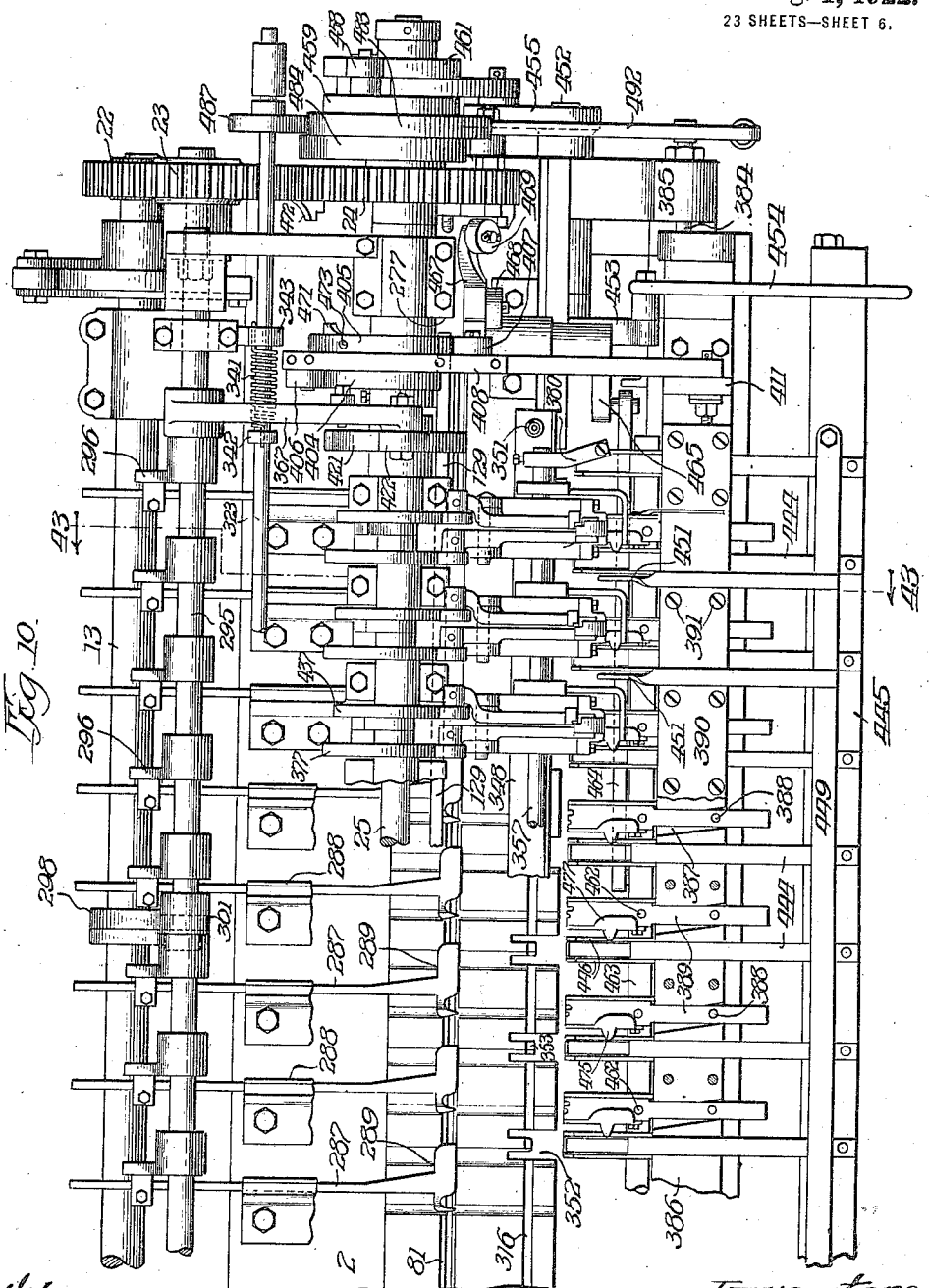

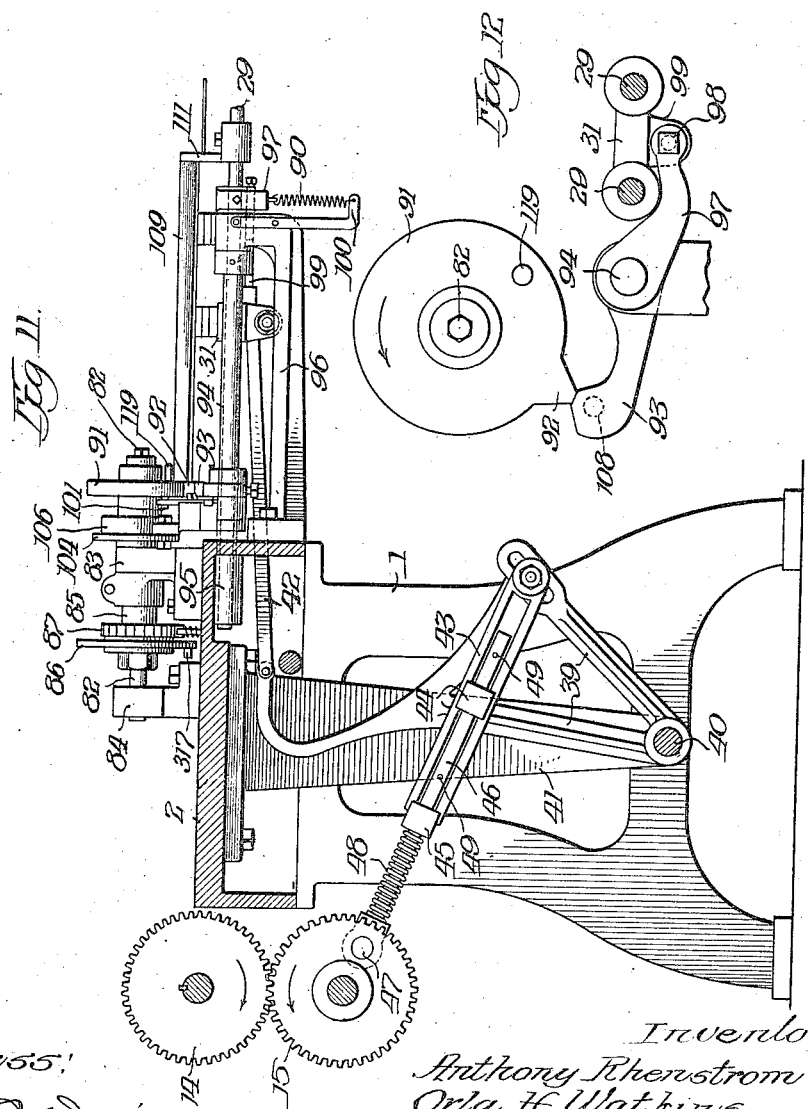

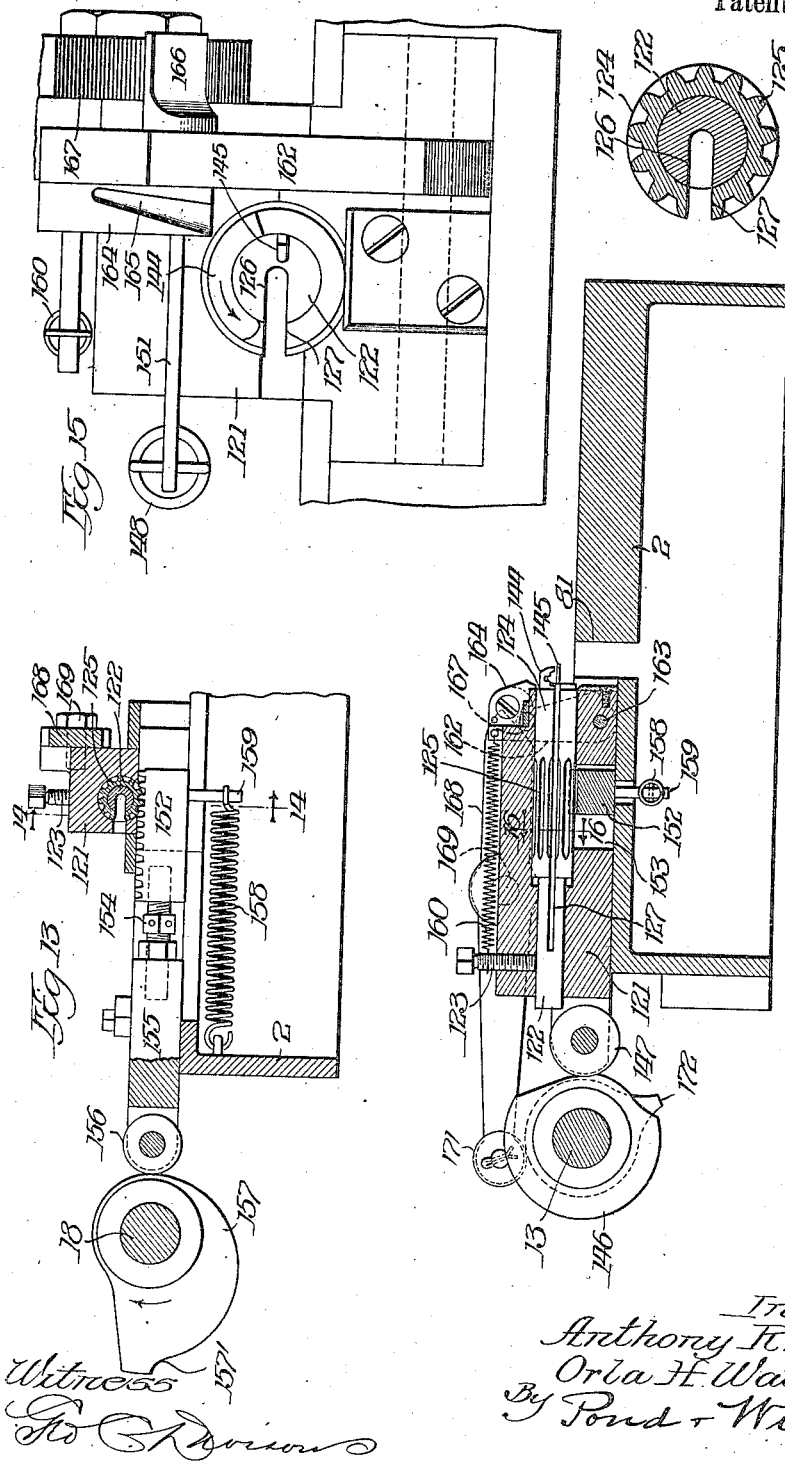

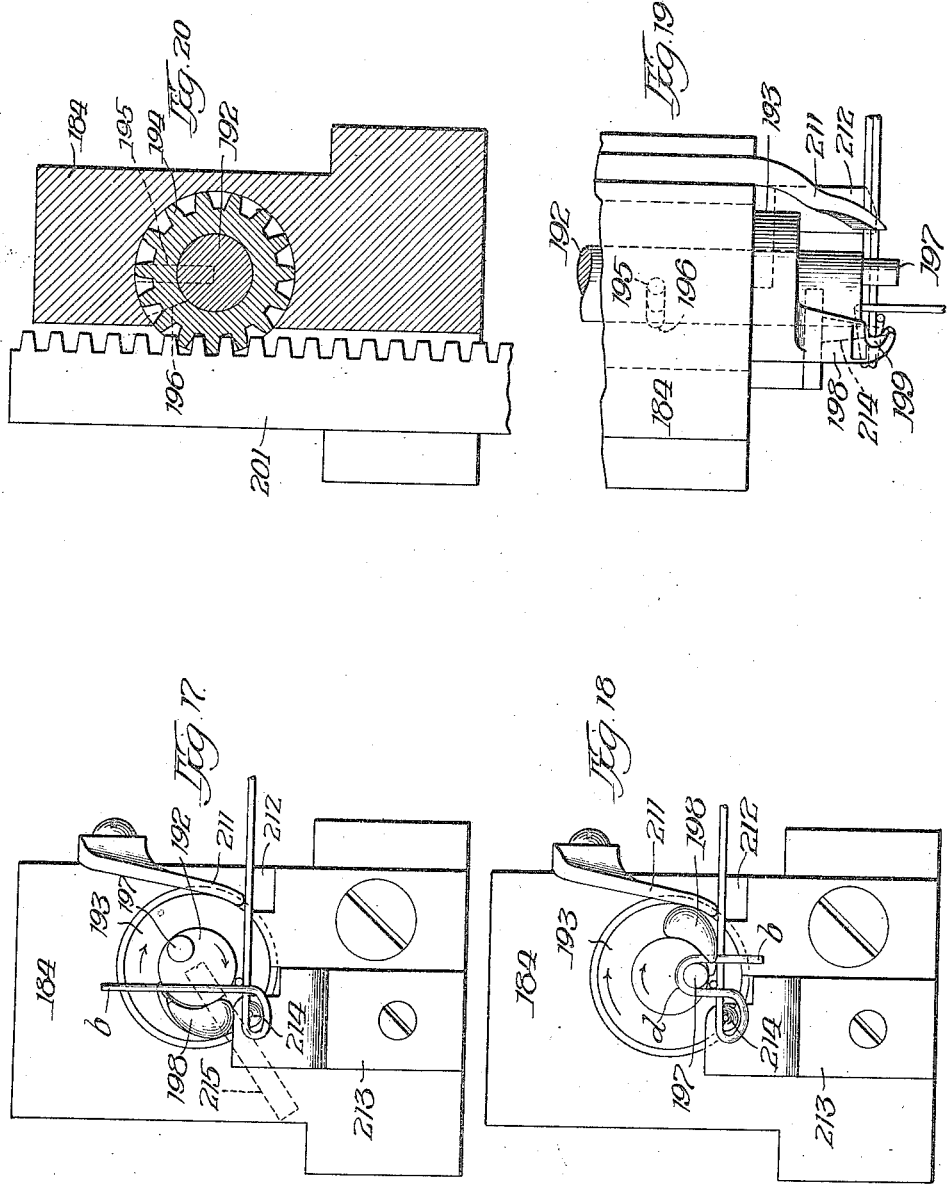

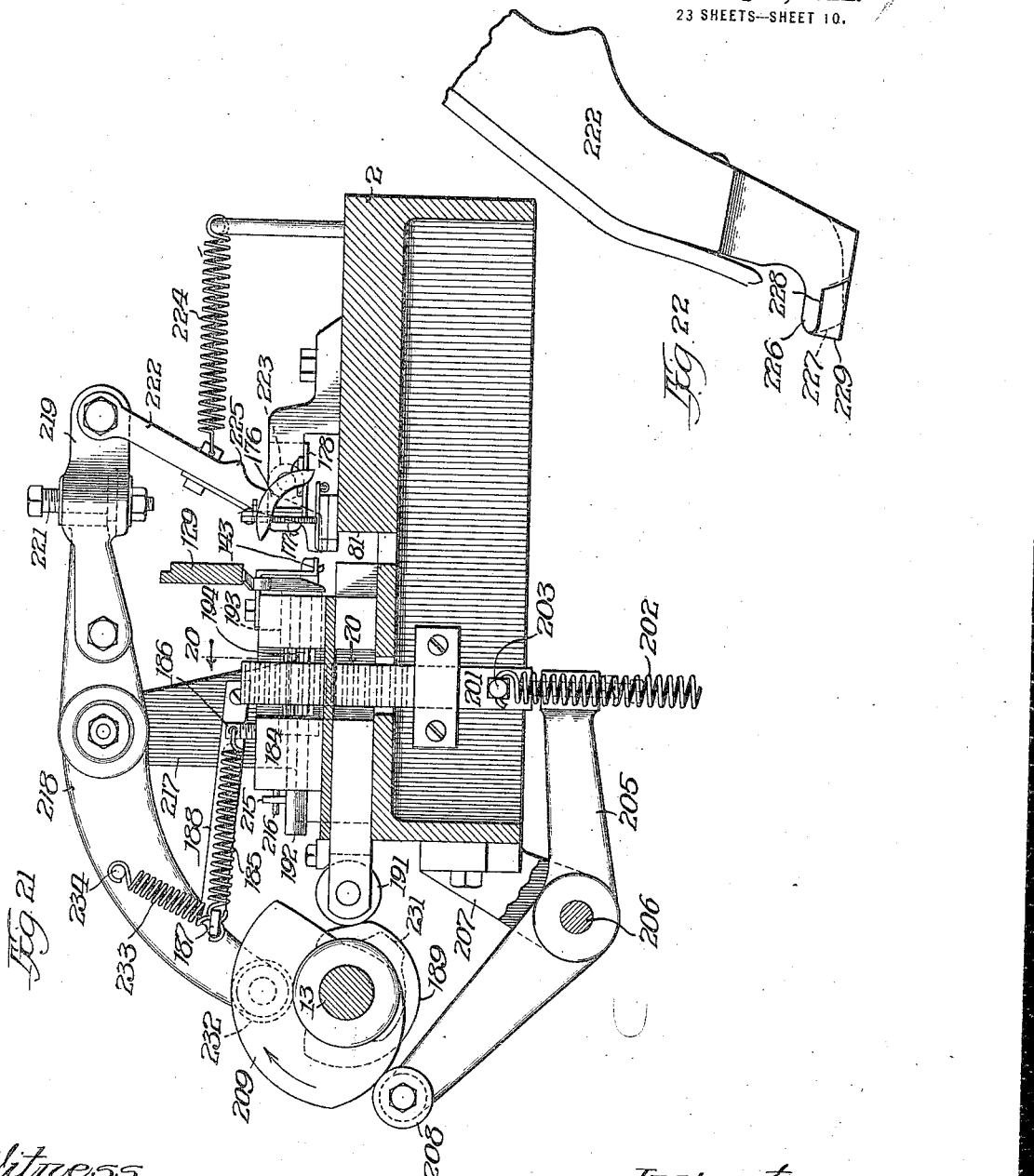

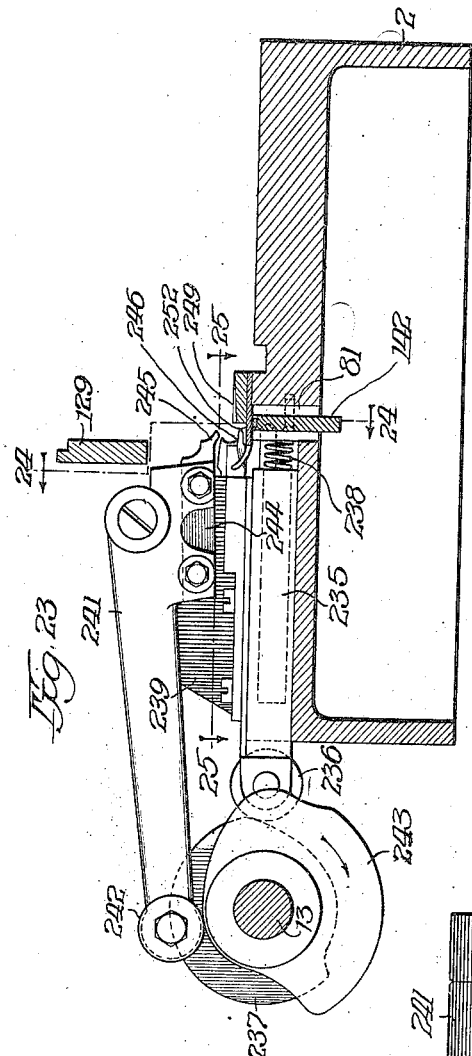
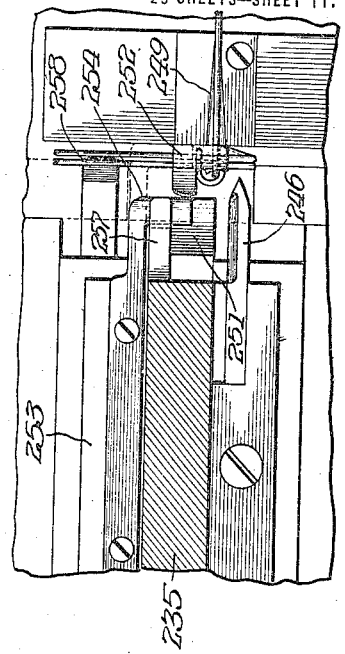
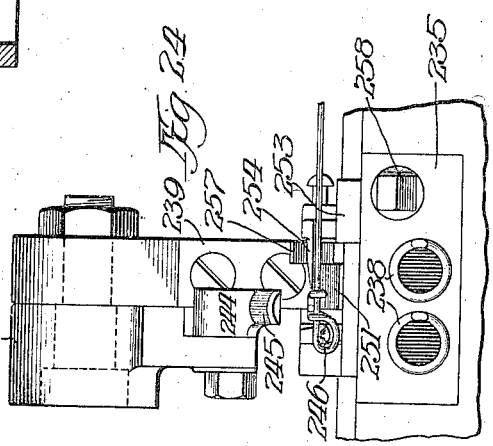

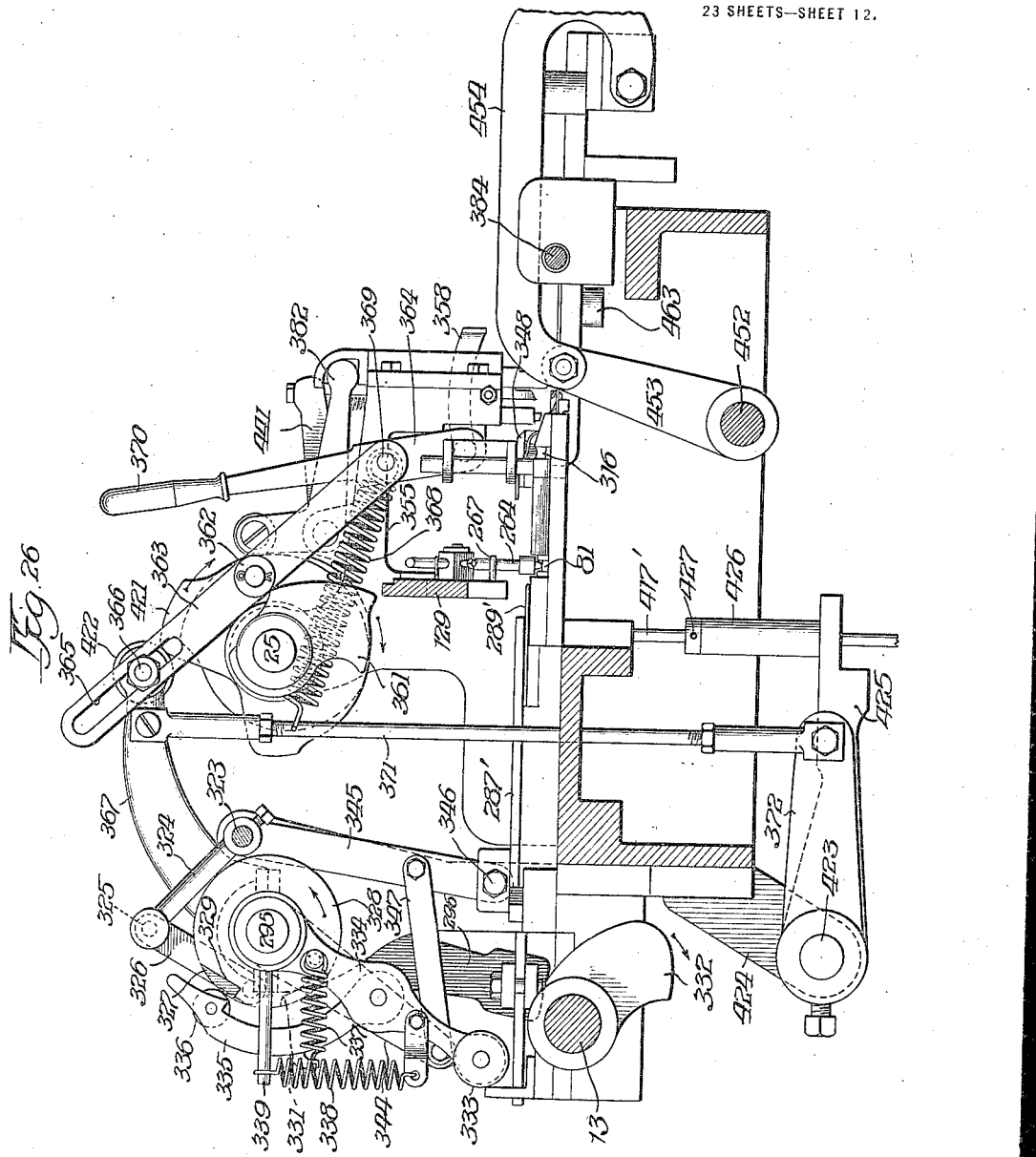

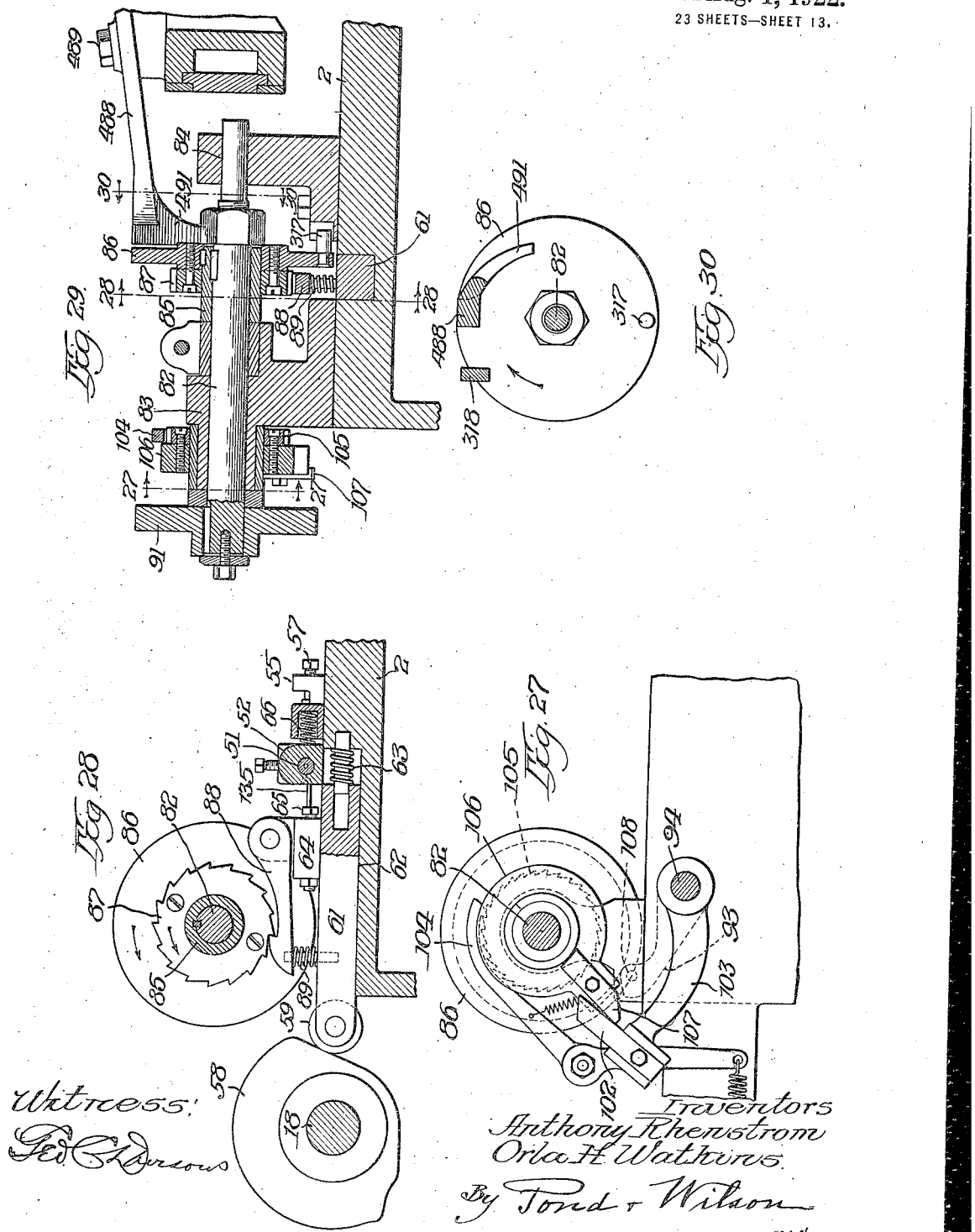

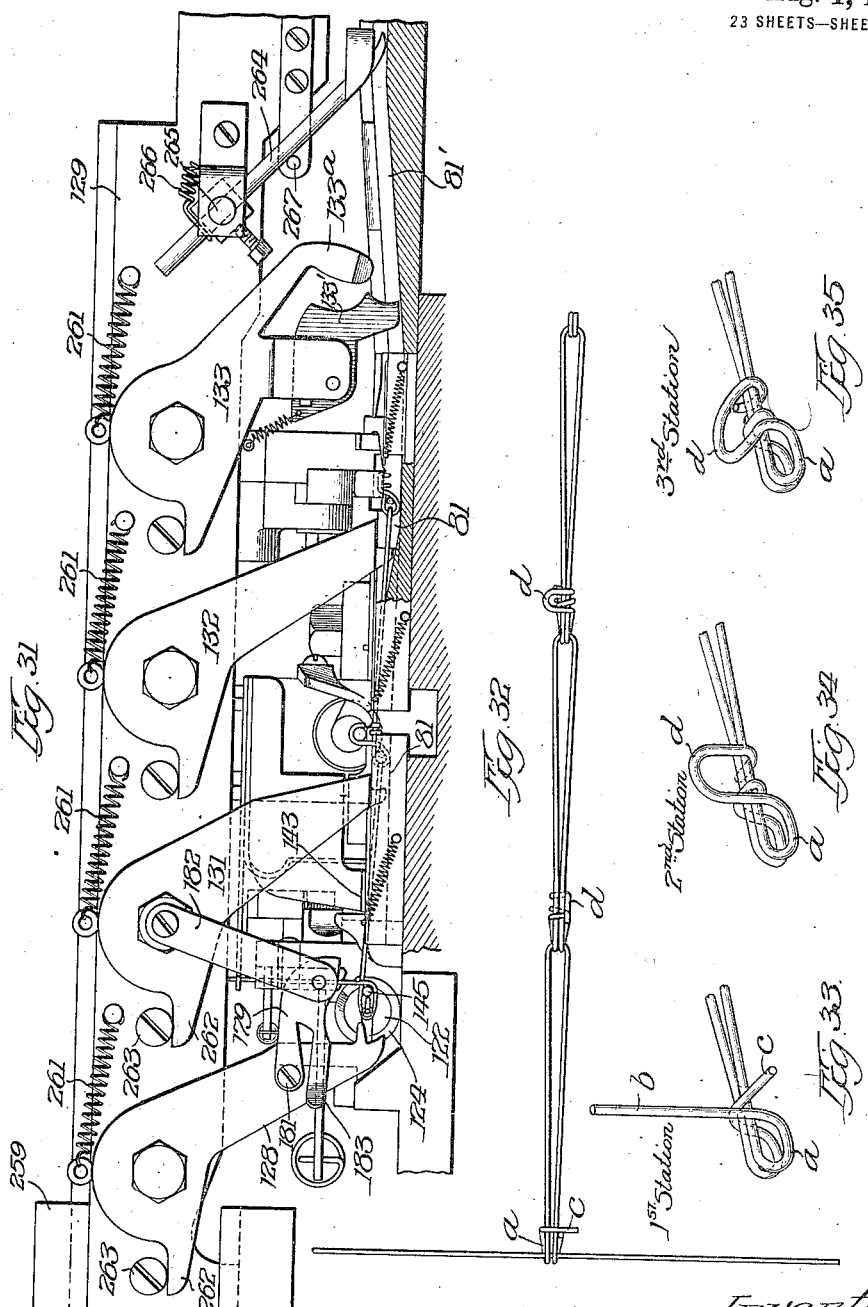

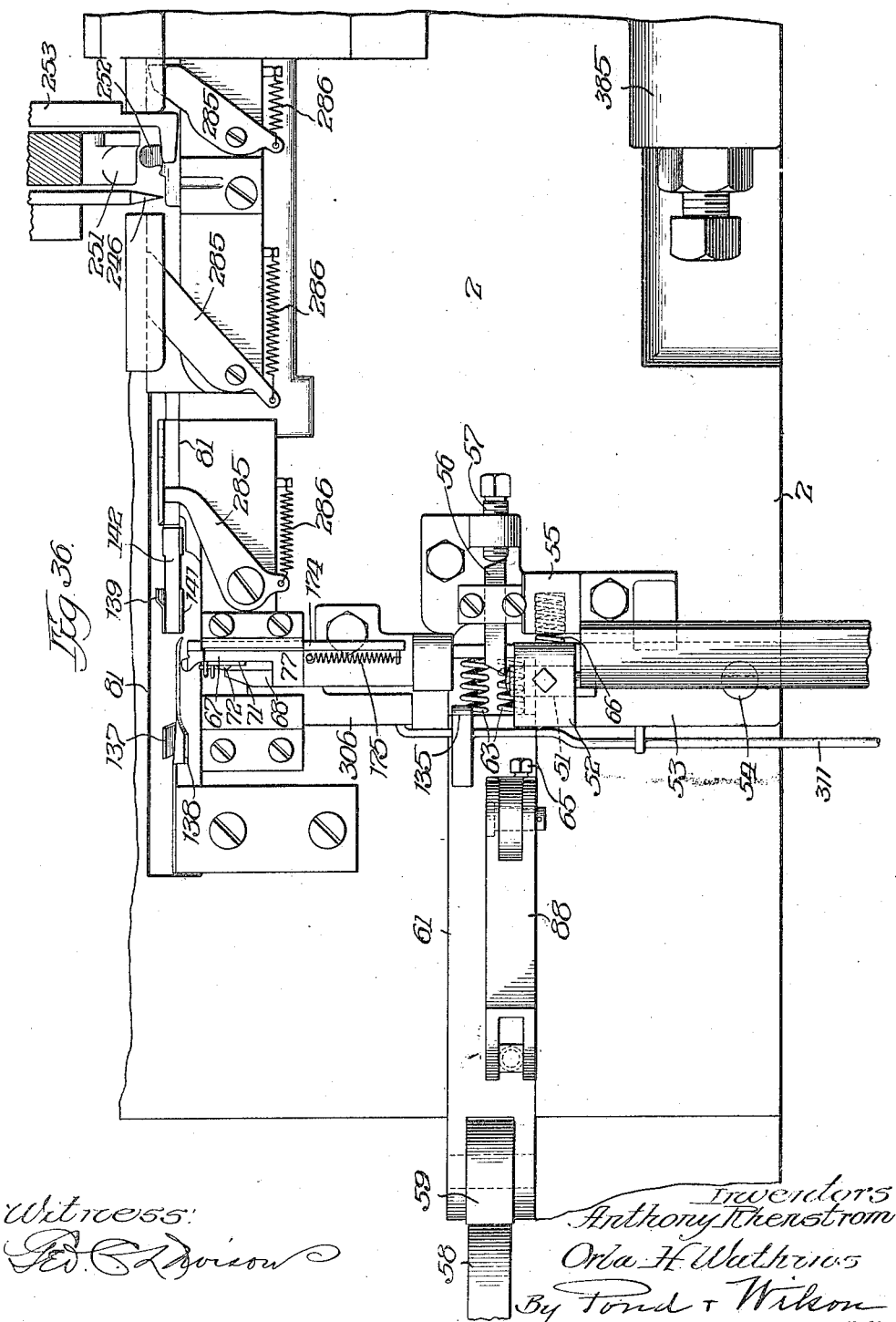

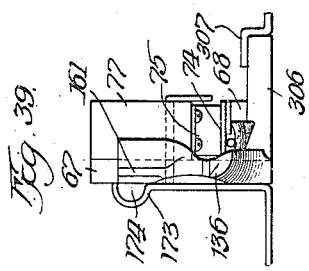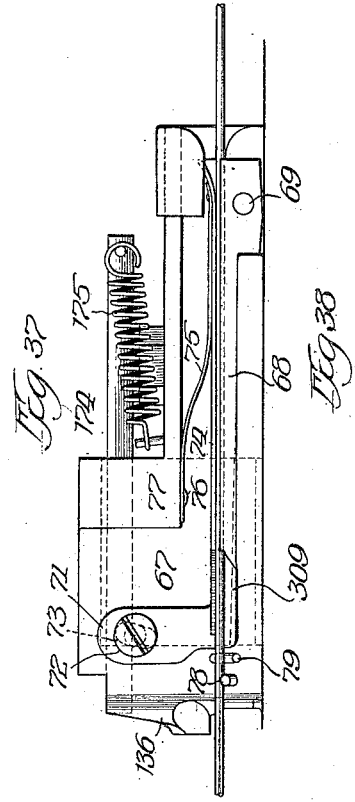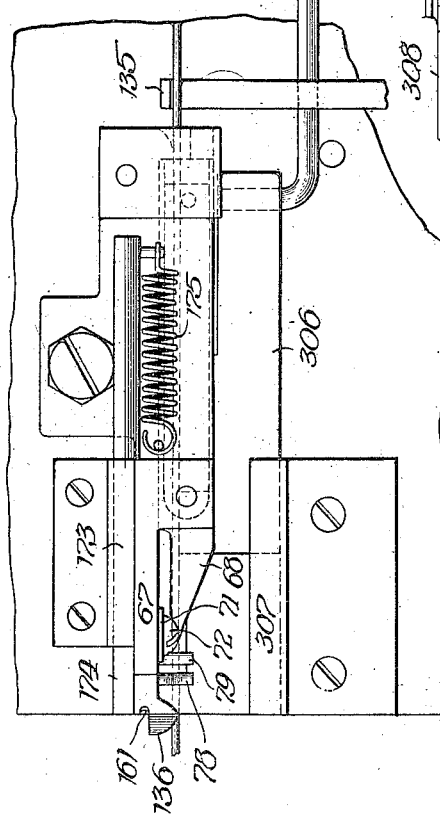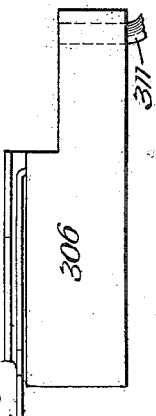

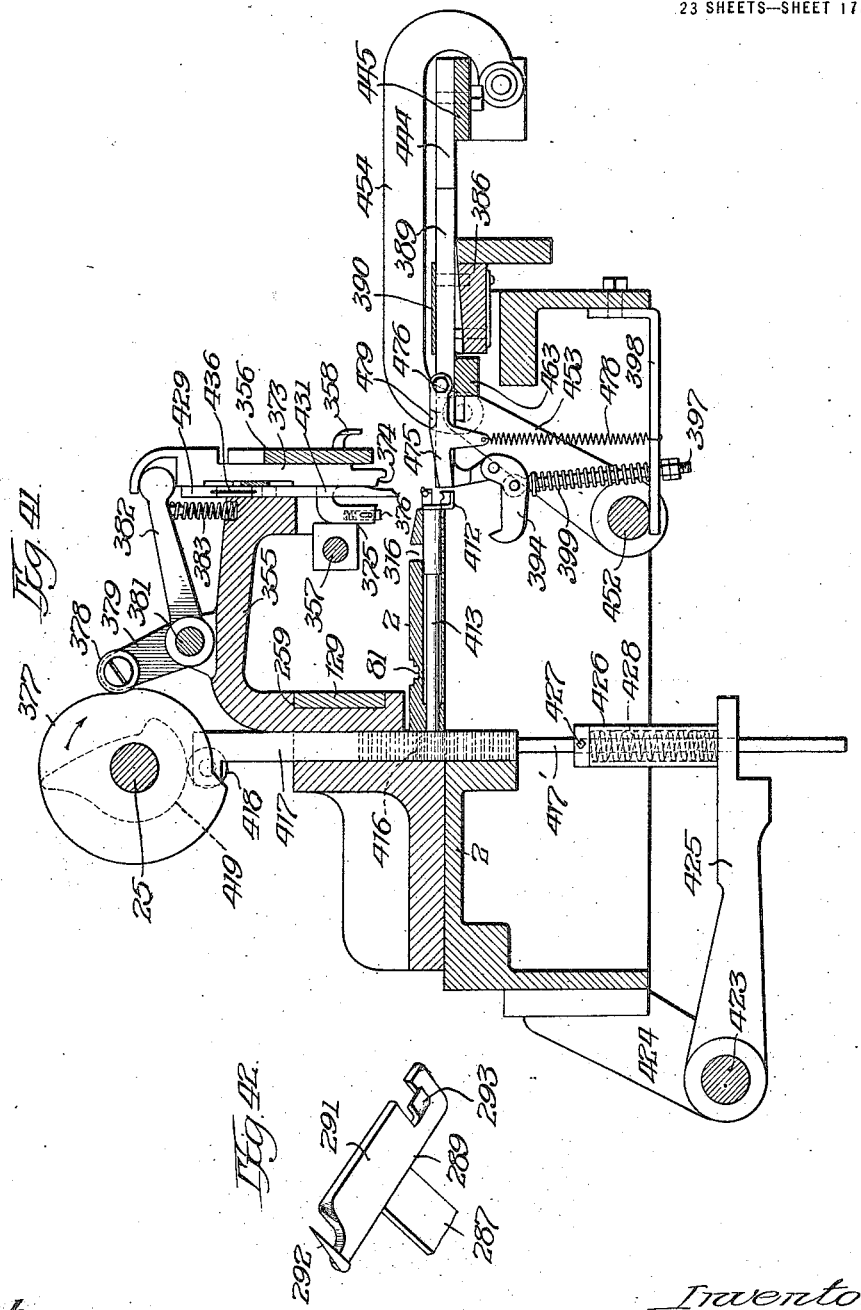

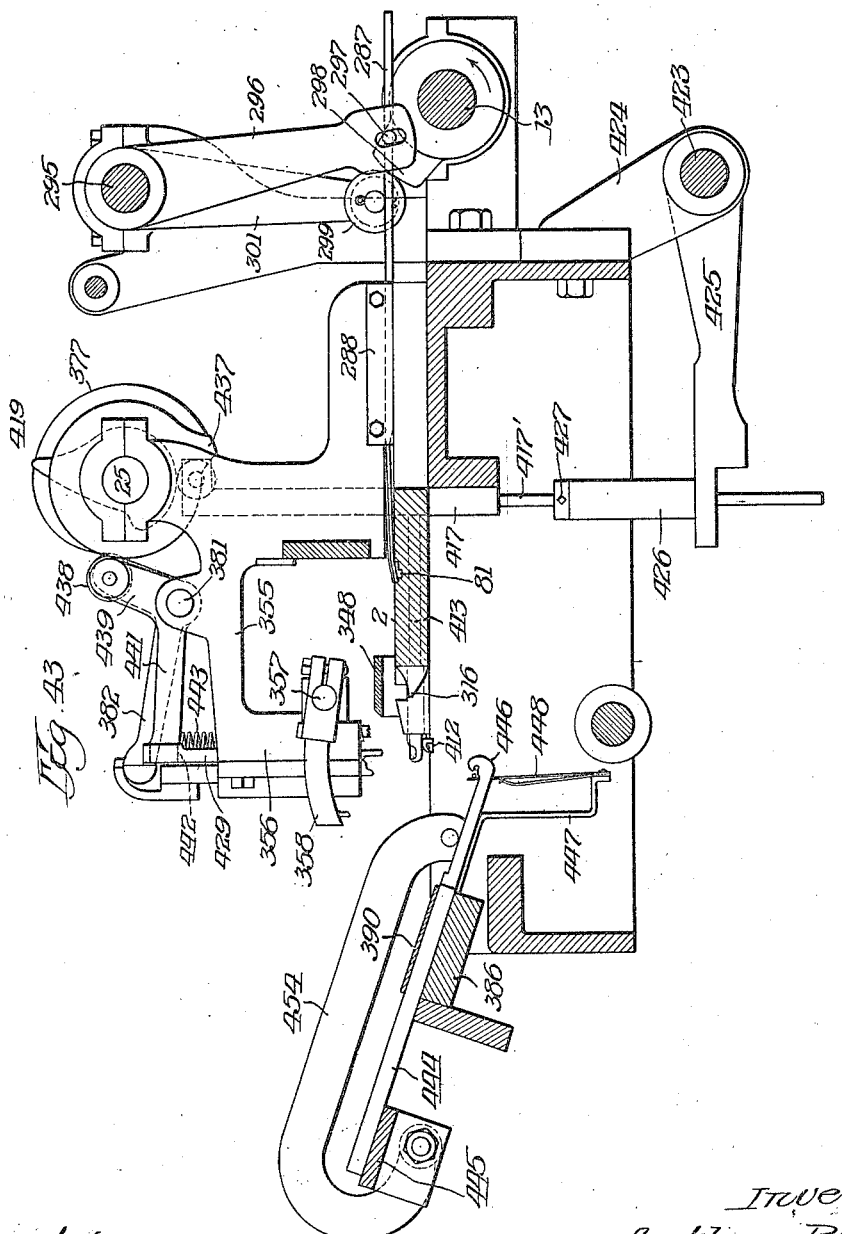

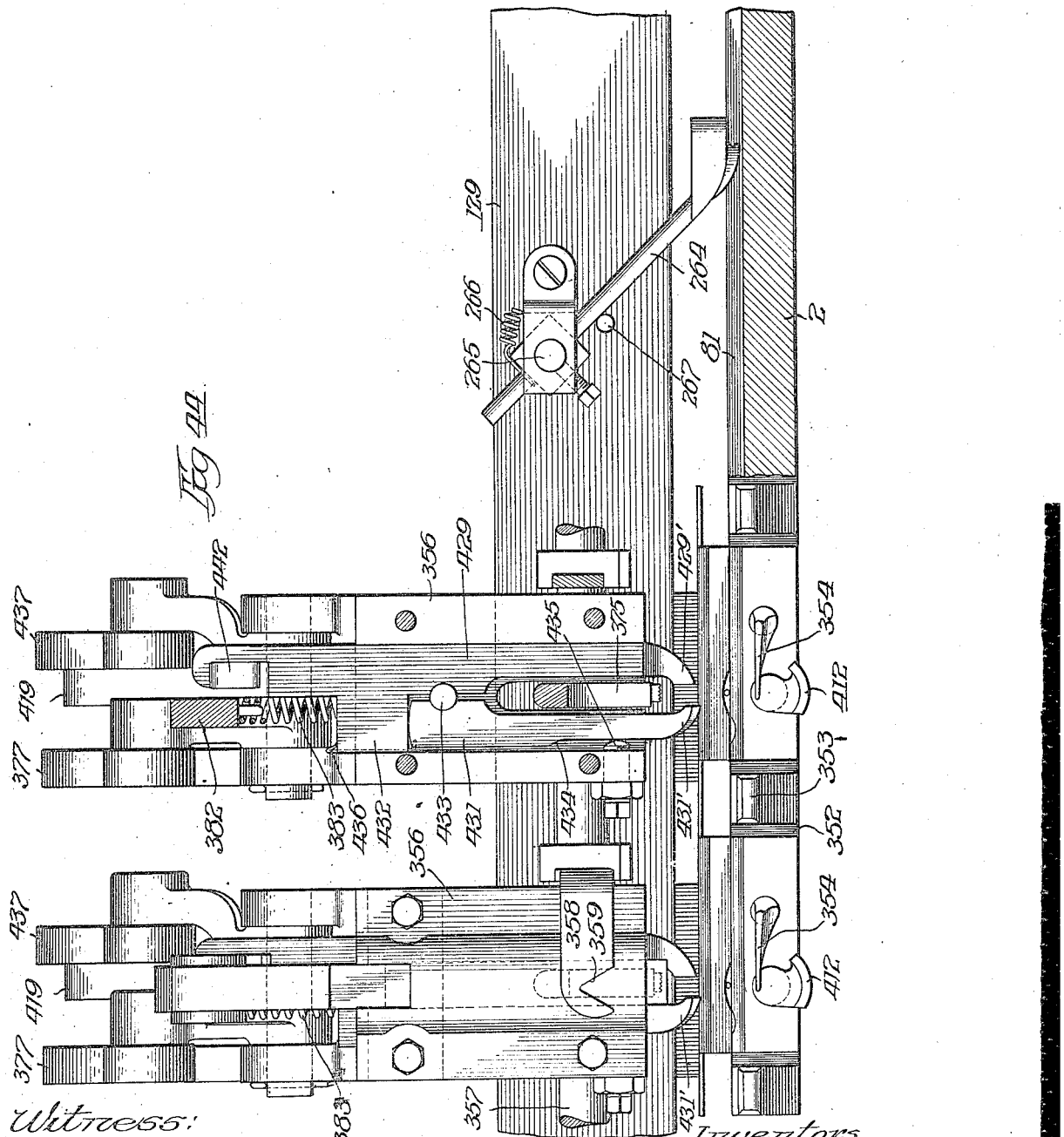

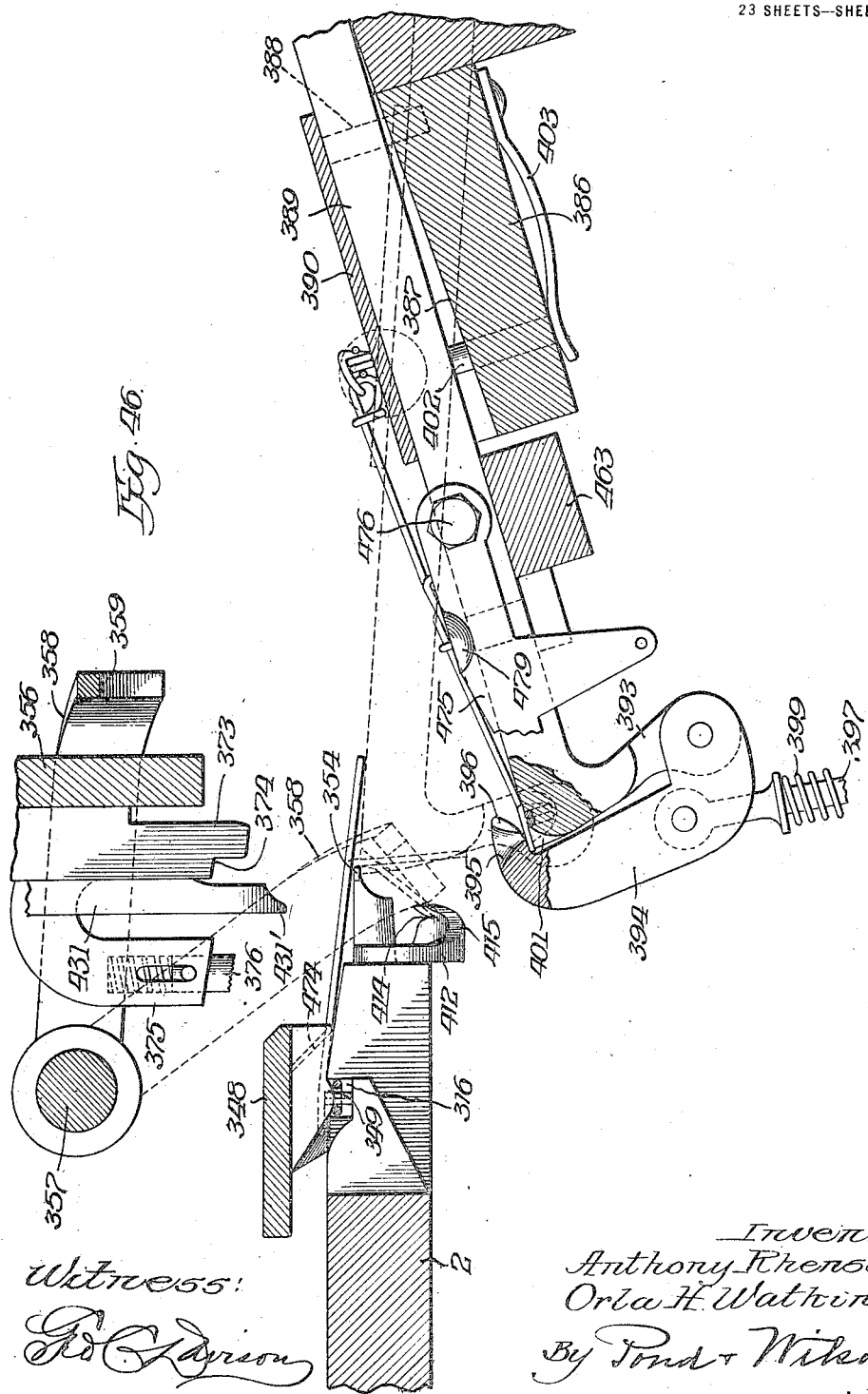

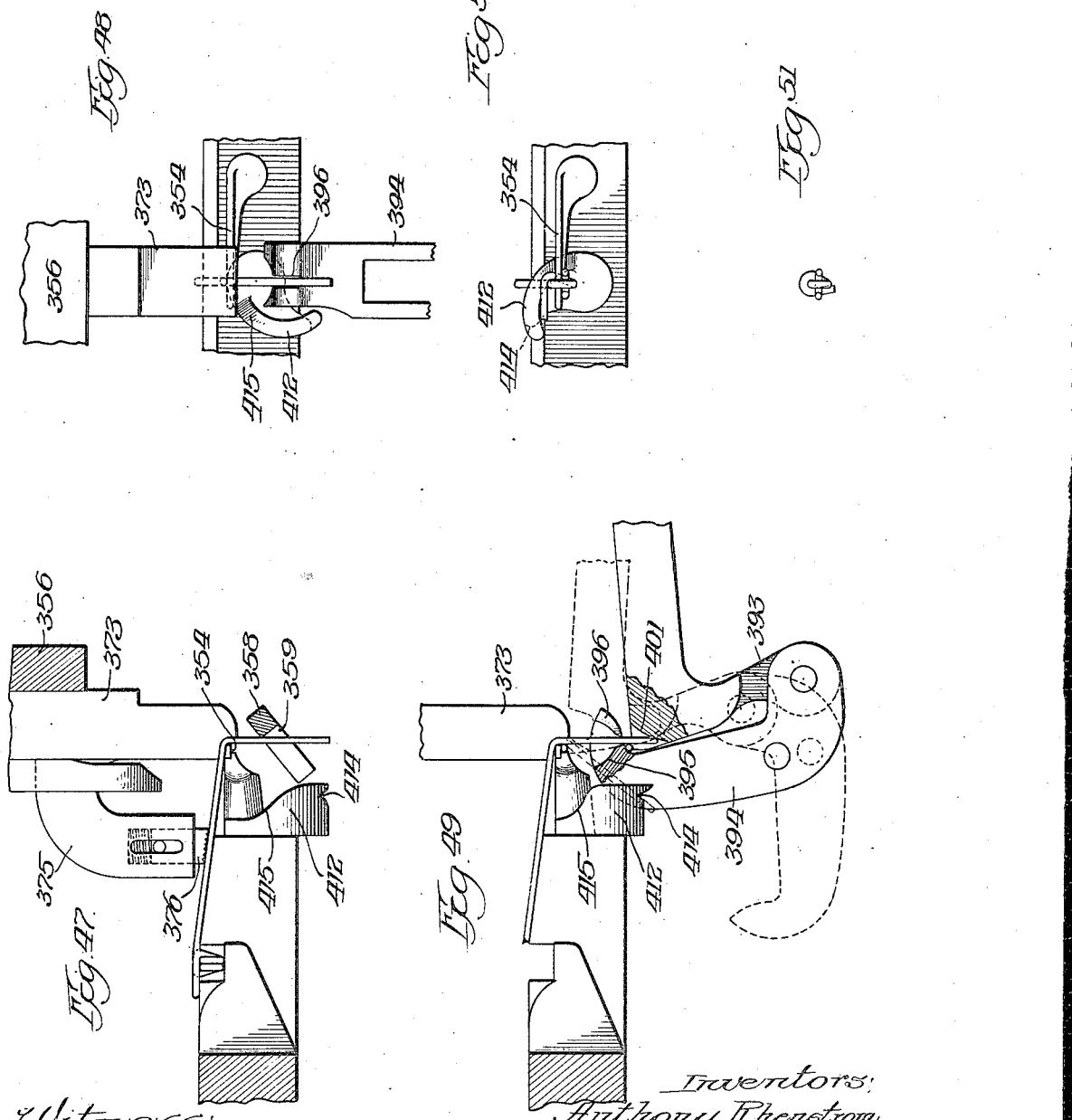

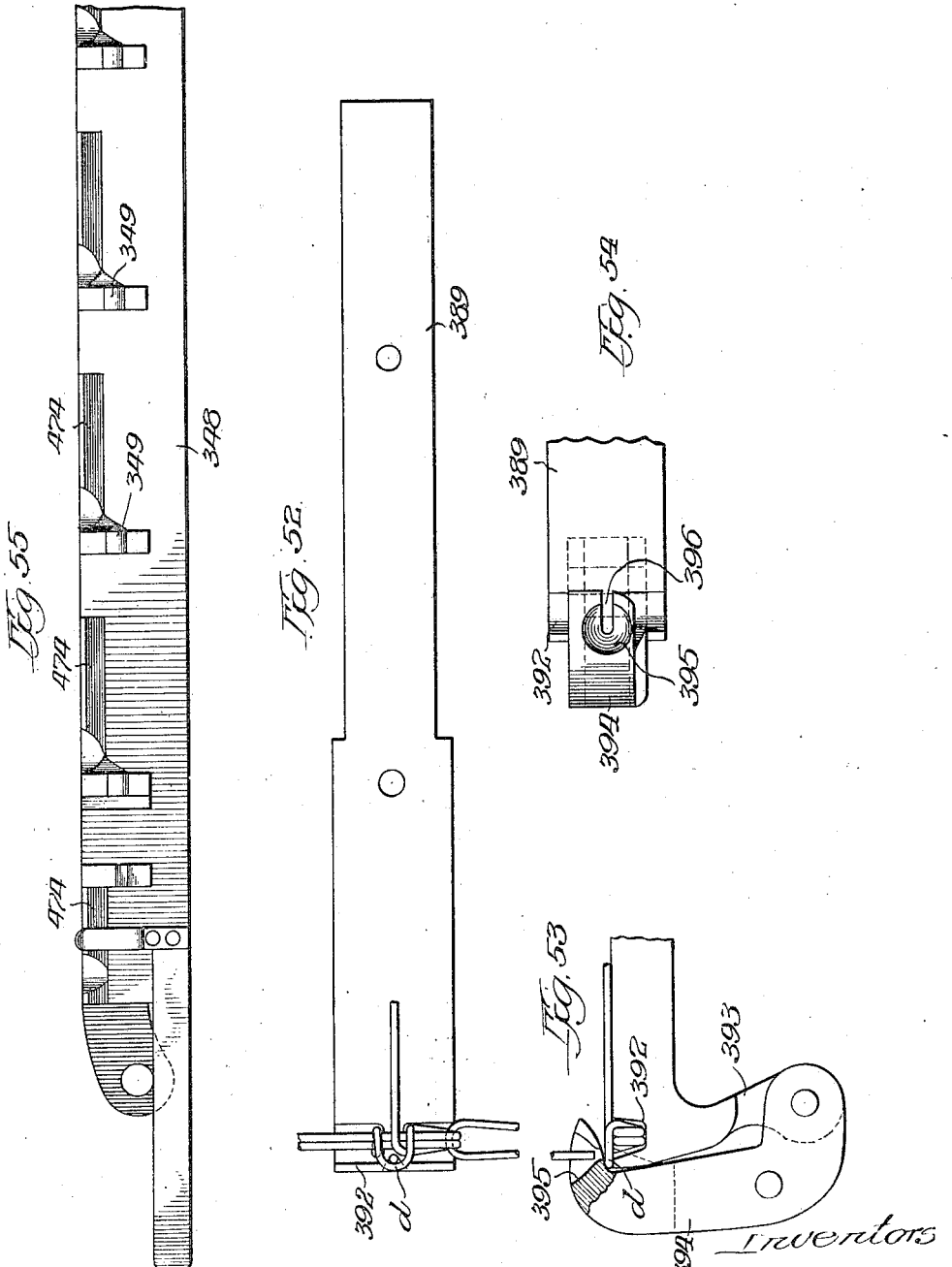

UNITED STATES PATENT OFFICE.

ANTHONY RHENSTROM, OF KENOSHA, WISCONSIN, AND ORLA H. WATKINS, OF MARSHALLTOWN, IOWA, ASSIGNORS TO HENRY RICHARDSON, OF CHICAGO, ILLINOIS.

WIRE-LINK-FABRIC MACHINE.

1,424,379.   Specification of Letters Patent.   Patented Aug. 1, 1922.

Application filed April 6, 1917. Serial No. 160,155.

*To all whom it may concern:*

Be it known that we, ANTHONY RHENSTROM, a citizen of the United States, residing at Kenosha, Wisconsin, and ORLA H. WATKINS, a citizen of the United States, residing at Marshalltown, Iowa, have invented certain new and useful Improvements in Wire-Link-Fabric Machines, of which the following is a specification.

This invention relates to machines for making wire link fabrics of the kind extensively used for bed and couch bottoms; and among the novel objects of the invention are, to provide in such a machine means for making unconnected fabrics of a definite size, to provide means in a machine for feeding sections of the wire of unequal lengths whereby to make links of vari-form shapes, to provide automatic means for predetermining the order in which such unequal sections of wire shall be fed to a machine, and to provide means whereby identical links may be formed and directly engaged with each other to constitute fabric, thus avoiding the use of other and different links for connecting adjacent identical units of the fabric either lengthwise or crosswise of the latter.

The machine of the present invention has been designed, primarily, for the manufacture of wire link fabrics employing a comparatively light wire and wherein the necessary tensile strength is obtained by securing the flexible connections of the links of the fabric against separation or creeping under strain. The flexible joint forming elements of the links of the specific fabric shown in connection with our machine are formed intermediate of the ends of the wire of which each link is composed and the end portions of the wire are so disposed as to secure said joint-forming elements of the links against separation or creeping under strain, avoiding the use of hooks or other forms of link connecting elements having free ends. Fabrics of this type may be made in No. 17 gauge wire, and by test have been found to possess greater tensile strength than the ordinary commercial fabric made in No. 14 gauge wire, and wherein the links are connected by hooks having free, unsecured ends. By the expression "means for anchoring a free end of the wire to secure connected links against separation under strain" and similar expressions used in certain of the claims, I intend any means by which the free end of the wire beyond a link connecting element is so strongly connected to a body or main tension member of a link as to prevent the possibility of the link-connecting element opening out or slipping lengthwise of a body or main tension member under the maximum strains to which the fabric may be subjected in service.

It will readily be understood, therefore, that an important feature of the present machine resides in the mechanisms and devices by which the free ends of the wire are clinched or otherwise anchored or secured to the body members of the links or cross-connecting members to thereby prevent separation of the links or displacement of the joint forming elements under the strain imposed upon the fabric in service. It is to be understood, however, that within the broad scope of the invention the same is not limited to the feature of securing the joint-forming elements of the links against strains, since the machine of the invention possesses novel link and chain-forming and fabric assembling parts or elements that may be employed independently of the link-securing features.

The particular fabric which the present machine, organized and operating as herein shown and described, is designed to produce is described in Letters Patent of the United States to Henry Richardson, No. 1,098,686, granted June 2, 1914, and illustrated in Figs. 5 to 8 inclusive thereof, and also in Fig. 56 of the present drawings; but, it is to be understood that the present machine, within its principle of operation and fundamental operative parts, and with detail modification of its wire-forming or bending mechanisms, is capable of producing a variety of specifically different fabrics.

In a machine of this character, it is desirable, from the view-point of economy of time and labor, to equip the machine with means by which complete, individual fabrics of a predetermined size may be separately made, thus avoiding the necessity of subsequently sub-dividing a large fabric into a number of individual fabrics of the desired size by a process of separation involving the subsequent undoing of certain work which the machine has previously done.

We have, accordingly, in the present machine, provided mechanism whereby, as soon as a single strand or chain of the required length has been run out, the feed of the wire may be intermitted during one forward step of the chain-advancing mechanism, and the completed chain is shifted laterally, so as to permit the running out of the next chain of the same length over the path of the previously formed chain, and so on until the necessary number of chains to produce a fabric of the desired size have been completed. As each chain is formed and shifted laterally out of the chain-forming path, it is then connected sidewise to the previously formed chain, in this manner building up the fabric until the full size has been reached. Through a mechanism which causes the omission at intervals of the cross-connecting members of a strand or chain, a gap is produced between the last chain of one fabric and the first chain of the next fabric, whereby successively formed, complete fabrics are automatically separated.

The particular fabric which the machine herein shown and described produces embodies links formed with integral cross-arms, and these cross-arms are looped into lateral eyes of previously formed strands, thus connecting the strands into the fabric; and in the present machine the automatic separation of successive fabrics is produced by a short feed of the wire during the running out of a strand or chain of each fabric, which omits the integral cross-arms from that chain so that, between the first chain of one fabric and the last chain of the previous fabric, the chain-connecting mechanism operates idly.

In the accompanying drawings we have illustrated one practical embodiment of the principles of our invention in a machine organized and constructed to produce from a coil of wire complete, individual unconnected fabrics of predetermined size, having the structure illustrated in Figs. 5 to 8, inclusive, of the Richardson Patent No. 1,098,686, above referred to; and it is believed that the structure, the principle of operation, and mode of use of this machine will be readily understood by those familiar with the general art of wire-fabric machines from a consideration of the drawings in connection with the detailed description:

First, briefly describing the several figures of the drawings,—

Fig. 1 is a front elevation, broken out between its ends, of the machine;

Fig. 2 is a rear elevation of the same, broken out between its ends;

Fig. 3 is an end elevation from the wire-feeding end of the machine, with some parts omitted for the sake of clearness;

Fig. 4 is a fragmentary plan view of a portion of the wire-feed mechanism.

Fig. 5 is an end view of Fig. 4 as seen from the right of the latter with the pawl release mechanism omitted.

Fig. 6 is an elevation from the end opposite the wire-feeding end, with parts omitted for the sake of clearness;

Fig. 7 is a transverse, vertical section, taken on the line 7—7 of Fig. 2;

Fig. 8 is a fragmentary sectional view, showing the main clutch, taken on the line 8—8 of Fig. 2;

Figs. 9 and 10 connectedly constitute a broken out plan view of the machine, Fig. 9 showing the feeding end portion, and Fig. 10 showing the fabric-assembling portion, certain parts being broken out and omitted in both views to disclose underlying parts.

Fig. 11 is a transverse, vertical section, taken on the line 11—11 of Fig. 9, with parts omitted;

Fig. 12 is a fragmentary detail, showing the cam mechanism for controlling the variable-length feed of wire, the parts being shown in the position for effecting the shortened feed;

Fig. 13 is a fragmentary, longitudinal, vertical, sectional view, taken on the line 13—13 of Fig. 9, and illustrating the mechanism for oscillating the first loop-former;

Fig. 14 is a transverse, vertical section, taken on the line 14—14 of Fig. 13, and showing principally the mechanism for actuating the slide which carries the first loop-former and the cross-arm bender;

Fig. 15 is a fragmentary detail, showing the first loop-former and the cross-arm bender in front elevation, as these parts appear viewing Fig. 14 from the right;

Fig. 16 is an enlarged vertical, sectional detail of the first loop-former and its non-rotatable core, taken on the line 16—16 of Fig. 14;

Fig. 17 is a full-size front elevation of the second loop-former, the parts being shown in their initial or starting position;

Fig. 18 is a view similar to Fig. 17, showing the parts in their final position;

Fig. 19 is a fragmentary top plan view of the forward end of Fig. 17;

Fig. 20 is a transverse, vertical section through the mechanism for oscillating the second loop-former, taken on the line 20—20 of Fig. 21;

Fig. 21 is a transverse, vertical section, taken on the line 21—21 of Fig. 9, and showing principally the actuating mechanism of the second loop-former, the cross-arm guide located between the first and second loop-formers, and the mechanism for tucking under the free end of the wire beyond the lateral loop or eye of the link, and also the other free end of the wire on the marginal chains or strands of the fabric which omit the cross-arm;

Fig. 22 is a full-size, fragmentary detail view of the lower end of the loop tucking foot shown in Fig. 21;

Fig. 23 is a transverse, vertical section on the line 23—23 of Fig. 9, showing the mechanism for bending the lateral loop to horizontal position and clinching the free end of the wire beyond the loop to the body member of the link;

Fig. 24 is a front elevation of the parts shown in Fig. 23 as seen on the line 24—24 of the latter figure;

Fig. 25 is a horizontal section, taken on the line 25—25 of Fig. 23 and showing the lateral loop bending and wire clinching mechanisms in top plan view;

Fig. 26 is a transverse, vertical section, taken on the line 26—26 of Fig. 9;

Fig. 27 is a transverse section on the line 27—27 of Fig. 29, showing, in front elevation, the principal parts of the mechanism for determining the number of longitudinal chains or strands in a fabric, and controlling the point of separation between two successively-formed fabrics.

Fig. 28 is a longitudinal vertical section, taken on the line 28—28 of Fig. 29, showing the mechanism which controls the number of links in each longitudinal strand or chain of the fabric, and also illustrating, in part, the wire-cutting mechanism which severs the wire in proper lengths for the individual links as it is fed into the machine;

Fig. 29 is a vertical section on the line 29—29 of Fig. 9;

Fig. 30 is a vertical section, showing the clutch-shifting bar and the chain-transfer shifting bar in cross-section, as seen on the line 30—30 of Fig. 29;

Fig. 31 is an enlarged, fragmentary front elevation of the principal mechanisms employed in performing the several link-forming and shaping operations, illustrating the three stations at which these operations are successively performed on each link, and a group of four bodily reciprocating feed-pawls, by which the chain is successively advanced under a step-by-step movement past the three stations;

Fig. 32 is a top plan view of a portion of the first (edge) chain of a fabric, illustrating successive stages in its formation at the three stations shown in Fig. 31;

Figs. 33, 34 and 35 are perspective views, illustrating three successive steps in the formation of a link, performed at the first, second and third stations, respectively.

Fig. 36 is a fragmentary plan view, showing the wire-feed, cut-off and guiding mechanism on the stationary table at the wire-receiving end of the machine;

Fig. 37 is a side elevation of the wire-guiding mechanism located directly opposite the front end of the first loop-former;

Fig. 38 is a top plan view of Fig. 37, including a device for introducing a dummy wire during the formation of the terminal loop of the last link of each chain, in order to insure a loop of uniform size;

Fig. 39 is a left end elevation of Fig. 38;

Fig. 40 is a fragmentary detail, in plan view, of the dummy wire and the mechanism for introducing the same in the formation of the terminal loop of the last link of the chain;

Fig. 41 is a transverse vertical section, taken on the line 41—41 of Fig. 9, illustrating principally the mechanism for connecting each chain when completed to a previously formed portion of the fabric;

Fig. 42 is a fragmentary, perspective detail of the forward portion of one of the chain-transfers bars which carry the chain from the chain-forming and guiding channel to the fabric-assembling channel;

Fig. 43 is a transverse, vertical section on the line 43—43 of Fig. 10;

Fig. 44 is an enlarged view, mainly in front elevation, of a part of the mechanism for connecting adjacent longitudinal strands or chains of the fabric together by looping the cross-arms of each chain through the lateral loops of the previously formed chain, the front plate of one of the forming heads being removed to disclose interior parts.

Fig. 45 is a fragmentary plan view, enlarged, showing the transfer-bars in their forward position, wherein they have carried the chain laterally from the chain-forming and guiding channel to the fabric-assembling channel;

Fig. 46 is a full-size, fragmentary view, mainly in transverse section, of the fabric-assembling mechanism;

Figs. 47 to 51, inclusive, are fragmentary detail views, illustrating successive steps in the fabric assembling operation. Fig. 48 being a front elevation of the parts shown in Fig. 47, Fig. 50 being a front elevation of the cross-arm loop-former, and Fig. 51 illustrating the completely formed loop of the cross-arm;

Fig. 52 is a detail plan view of one of a series of transverse elements of the tiltable skeleton frame which supports the last chain of the assembled fabric structure for the application or addition thereto of the next chain;

Fig. 53 is a fragmentary view in side elevation, showing a portion of the skeleton frame element of Fig. 52 in connection with the cross-arm funnel guide;

Fig. 54 is a plan view of the parts shown in Fig. 53;

Fig. 55 is a bottom plan view of the forward end of a clamp-bar that overlies each chain when the latter is in position to be connected on the previously formed fabric and holds it in place during the annexing operation;

Fig. 56 is a fragmentary, perspective view of the fabric produced by the machine.

Referring to the drawings, 1 designates each of a pair of upright end frame members that support between them a generally rectangular platform or table 2 that carries most of the operating parts of the machine. 3 designates the power shaft, best shown in Fig. 2, on which is loosely mounted a driving pulley 4, receiving movement from a suitable source by a belt 5. The power shaft 3 is journaled in bearings 6 and 7 carried by bearing brackets 8 and 9 respectively, Figs. 2 and 3, directly or indirectly attached to the main supporting frame of the machine. The hub of the pulley 4 carries a spur gear 11 that meshes with and drives a large spur gear 12 that is fast on one end of a cam-shaft 13 that extends lengthwise of the rear side of the table or platform 2. Fast on the cam shaft 13 is another spur gear 14 that meshes with and drives a spur gear 15 keyed to the inner end of the drive shaft 3. The cam shaft 13 also has fast thereon a bevel gear 16 that meshes with and drives a mating bevel gear 17 (Fig. 9) keyed to one end of a cross-shaft 18, this latter being journaled in bearings 19 and 21 crosswise of the wire-receiving end of the machine. Keyed on the other end of the cam shaft 13 is a pinion 22 (Figs. 2 and 6) that, through an idler gear 23, drives a spur gear 24 that is loosely mounted on a head cam shaft 25 extending longitudinally of and above the table or platform of the machine, and best shown in Figs. 9 and 10. From the shafts above described most of the actuating mechanism of the various wire engaging parts derive their power.

Proceeding now to a detail description of the various wire-engaging parts and their actuating devices, we will describe these parts in the general order in which they operate upon the wire as it passes through the machine.

*Wire feed mechanism.*

The wire, taken from a suitable reel or coil, is led into the machine transversely of the left hand end of the latter, viewing Figs. 1 and 9, the wire first passing through vertical and horizontal groups 26 and 27 of straightening rolls (Fig. 3), these latter being carried by a bracket 28 that is mounted on the outer end of a pair of parallel rods 29 (Figs. 4 and 5) that project horizontally from the front side of the table of the machine. The rods 29 also from a slideway to support a wire feed carriage 31, on which latter is mounted a pair of feed-pawls 32 carried by swivel posts 33, the sharpened ends of the pawls 32 cooperating with abutments 34 to grip or bite the wire and carry it inwardly upon each inward movement of the carriage 31, the pawls 32 being urged into biting engagement with the wire by a spring 35 connecting arms 36 and 37 that extend oppositely from the two swivel posts, all as clearly shown in Figs. 4 and 5. Fig. 11 best illustrates the actuating mechanism of the wire feed carriage 31, the same consisting of an elbow lever 39 pivoted on a stud 40 at the lower end of a bracket 41 depending from the table 2, a link 42 connecting the longer arm of the elbow lever 39 to the feed carriage 31, and an extensible pitman connecting the shorter arm of the elbow lever to the gear 15, the pitman comprising a section 43 carrying bearing blocks 44 and 45 and a rod section 46 that is connected to the gear 15 by a wrist pin 47, and a stiff compression spring 48 lying between the outer bearing block 45 and the head of the rod section 46. Extending through the rod section are a pair of pins 49 that normally lie against the right hand sides of the blocks 44 and 45, viewing Fig. 11. When, however, as will be hereinafter explained, the feed mechanism is set to give a short feed of wire, the spring 48 is compressed, and the rod section 46 of the pitman moves inwardly of its cooperating section 43, which is the position of the parts illustrated in Fig. 11.

From the feed carriage the wire passes through a tubular guide 51 (Fig. 36), mounted in an upstanding lug 52 on a block 53 that is pivoted near its outer end at 54 to the top of the table 2. Also bolted to the top of the table opposite the block 53 is a bracket 55 in which is mounted a stationary cutter bar 56, the cutting end of which lies directly opposite and cooperates in shear fashion with one end of the wire guide tube 51, the cutter 56 being rendered adjustable by a screw 57. The pivot block 53 which carries the movable member 51 of the cutter is actuated in a direction to shear the wire by a mechanism best shown in Figs. 9, 28 and 36, wherein 58 designates a cam keyed on the cross shaft 18 operating on a cam roller 59 carried by a slide 61 working in a slideway 62 countersunk in the table 2; the slide 61 and its roller 59 being normally urged into engagement with the cam 58 by a pair of compression springs 63. Fast on the slide 61 is a block 64 (Fig. 28) for a purpose hereinafter described; and in the forward face of the block 64 is tapped a machine screw 65, the head of which, as the slide 61 moves inwardly of its slideway, strikes the block 52 and forces the shearing end of the wire guide 51 across the shearing end of the stationary cutter bar 56, thus severing the wire beyond that point from the wire stock being fed into the machine. As the slide 61 is retracted by the springs 63, the cutter block 52 is shifted back to normal position by a spring 66 housed in a recess in the stationary bracket 55, as clearly shown in Figs. 28 and 36.

From the cutting mechanism the wire passes on through a spring-controlled guide and holder, the details of which are best shown in Figs. 36, 37, 38 and 39. This guide and holder comprises a stationary block 67 that is bolted to the table 2 and has mounted on one side thereof the lower member 68 of the wire guide proper, this latter being pivoted to the block 67 at 69 and at its other end having an upstanding arm 71 adjustably secured to the block 67 by a screw 72 engaging a slot 73 in said arm. The upper side of the guide strip 68 is concave in cross-section, and is overlaid by a flat guide-strip 74 that is secured to and carried by a leaf-spring 75, in turn secured at 76 to the underside of a shoulder 77 on the block 67. As best shown in Fig. 37, the wire passes lengthwise between the upper and lower guiding strips 74 and 68, and beyond the latter it passes above a pair of upwardly and downwardly inclined stationary fingers 78 and 79 that project laterally from the face of the block 67, these fingers cooperating with the principal guiding members in maintaining the correct alignment of the wire for engagement by the bending pawl, hereinafter described.

The block 67, which has other functions than to support the wire guide last described, faces upon a longitudinal groove or channel 81 that is formed in and extends lengthwise and substantially centrally of the main supporting table or platform 2, and constitutes a runway for each longitudinal strand or chain both during and subsequent to the link-forming and interconnecting operations; this channel appearing in part in Figs. 9, 10, 14, 21, 23, 31, 36 and 45.

In the manufacture of fabrics employing integral cross-arms for connecting laterally adjacent strands or chains, the cross-arm is preferably omitted on the last link of each chain (to which the helical springs of a bed or couch fabric are secured), and the cross-arms are also preferably omitted on all the links of one of the side marginal chains,—in this case, the first chain thrown out by the machine. Hence, it is desirable to provide mechanism associated with the wire feed mechanism that will automatically effect the feed of a shorter length of wire for the last link of each chain and for all the links of the first chain. Furthermore, in the manufacture of a fabric of a given length it is desirable to provide means for intermitting the feed of the wire between the last link of one chain and the first link of the next chain. The mechanisms for effecting, in the present machine, the above stated results will next be described.

Referring principally to Figs. 9, 11. 12 and 27 to 29 inclusive, 82 designates a shaft that is journaled in bearings 83 and 84 carried by the table 2 transversely of the receiving end of the machine. Keyed to this shaft is a sleeve 85 (Fig. 29), and keyed to the sleeve 85 is a disk 86 having functions hereinafter explained. Secured to one side of the disk 86 is a ratchet disk 87 that contains one more tooth than the number of links in a complete chain. Pivoted to the block 64 is a pawl 88 engaging the underside of the ratchet 87 and normally held to its work by a spring 89. By reference to Fig. 28 it will be seen that the pawl 88 is carried by the cam-actuated slide 61 on which the block 64 is rigidly mounted. Each reciprocation of the slide 61 therefore turns the ratchet 87 one tooth in a contra clockwise direction, viewing Fig. 28. Keyed to one end of the shaft 82 is a disk 91 which, as best shown in Fig. 12, has on its periphery a lug 92 that, once during each complete revolution of the disk 91 engages the free end of an arm 93 keyed on a rock shaft 94 (Figs. 11 and 12) that is journaled at one end in a bearing 95 formed on the table 2 and at its other end in a laterally projecting bracket 96 secured to the table. Fast on the shaft 94 is an oppositely extending arm 97 carrying at its free end an adjustable stop in the form of a screw 98. When the arm 97 is swung upwardly to the position shown in Figs. 11 and 12 by engagement of the lug 92 with the arm 93 the inner end of the stop screw 98 lies directly in the path of a similar projection 99 carried by the feed carriage 31, so that the latter is arrested short of its full outward position, the spring 48 of the actuating pitman permitting this short stroke of the feed carriage, as clearly shown in Fig. 11. This results in the feeding in to the machine to form the last link of each chain of a length of wire that is shorter than the other lengths on account of the omission of the cross arm from the last link of each chain. Arm 93 is normally held against the periphery of disk 91 and the stop 98 is held out of the path of projection 99 by a spring 90 connecting arm 97 to an abutment 100 depending from bracket 96 (Fig. 11).

The production of a succession of short length feed movements for the production of the first chain of each fabric (on which the cross arms are all omitted) is effected by a part of the mechanism last described in association with the following mechanism. On the rear side of the disk 91 (viewing the machine from the front side) is a laterally extending pin 101 (Figs. 9 and 11). This pin 101 during each complete revolution of the disk 91 strikes a lug 102 (Figs. 9 and 27) carried by an arm 103 that is loosely mounted on the shaft 94 and itself carries a drag pawl 104 engaging a ratchet 105 that is secured to one side of a disk 106 (Fig. 29). Ratchet 105 and disk 106 are frictionally journaled on a bearing afforded by one of the supporting members of shaft 82, and disk 106 carries a radially projecting lug 107 that is adapted, once during each rotation of ratchet 105 and disk 106 to engage a lateral pin 108 on the arm 93 (Figs. 12 and 27). The ratchet 105 contains as many teeth as there are longitudinal strands or chains in each complete fabric, and the parts are so timed that the lug 107 will engage the pin 108, thereby rocking the shaft 94 and throwing in the short wire feed just prior to the feeding in of the wire for the formation of the first chain of the fabric, holding the short feed operative during the running out of the complete first chain. At the conclusion of the running out of the first chain the pawl 104 steps the ratchet 105 forward another tooth, thereby disengaging the lug 107 from the pin 108 and permitting the shaft 94 to rock back to normal position, thus restoring the normal or long feed of the wire.

The means for intermitting the feed of the wire between the last link of each chain and the first link of the next succeeding chain comprises the following parts. Referring to Figs. 1, 5, 9 and 11, 109 designates a flat strip or bar that is pivotally mounted coincident with one edge on lugs or brackets 111 supported by one of the slide rods 29 so as to be capable of lateral oscillation, and the free edge of the bar 109 is adapted, when said bar is swung downwardly, to strike vertically projecting members 112 that are mounted on the feed pawls 32, so as to swing the latter out of wire-engaging position. The bar 109 is operated in this manner immediately after the short length of wire that forms the last link of each chain has been fed into the link-forming mechanism, through the following described mechanism, best shown in Figs. 1 and 9. 113 designates a bar that is pivoted to the table 2 at 114 and is normally held in retracted position by a spring 115. Mounted on this bar 113 is a vertical arm 116 which, by a pivoted bent link 117 is connected to a lug 118 on the back side of the strip or bar 109. On the outer face of the disk 91 is a laterally projecting pin 119 that, once during each rotation of the disk 91 engages the vertical arm 116, thereby rocking the bar 109 downwardly in a manner to disengage the feeding pawls, thus interrupting the feed of the wire through one stroke of the feed carriage. This action takes place immediately following the throwing-in of the short feed to form the last link of the chain.

*Link and chain-forming mechanism.*

In the present machine the links are shaped and connected in chain form simultaneously; the link-shaping operations being carried out successively at three stations, at the first of which the wire forming each link is connected onto the immediately preceding partially formed link. In Fig. 32 we have illustrated the several stages through which each section of wire passes in forming the first chain of a fabric, which is without the lateral cross-arm, and in Figs. 33, 34 and 35 are illustrated the wire bending operations that occur at the first, second and third stations respectively. Beyond the third station the chain is simply advanced endwise in a step-by-step movement lengthwise of the table or platform of the machine until a complete length of chain has been run out.

Considering now the link-shaping and connecting mechanisms, and referring principally to Figs. 13 to 16 inclusive and Fig. 31, 121 designates a slide block that is mounted to reciprocate on and transversely of the wire-receiving end of the table 2 at a point directly opposite the stationary block or anvil 67, above described, in connection with Figs. 37, 38 and 39. The block 121 is longitudinally cored to receive a rod 122 secured therein by a screw 123, and rotatably mounted on the rod 122 within an enlarged portion of the bore is an oscillatory loop-former, the body or shank 124 of which is provided with an elongated pinion 125. The core rod 122 and the loop-former body 124 are both longitudinally grooved as shown at 126 and 127 respectively (Figs. 15 and 16), said grooves registering with each other in the idle or retracted position of the loop-former. The core rod 122 by reason of its longitudinal groove or slot 126 receives the advance portion of the wire that is fed across the forming channel 81; and the foremost section of wire thus fed into the machine is, after having been cut off, drawn into hairpin form by the lower end of a feed pawl 128 (Fig. 31) that is pivotally suspended from a long endwise reciprocating bar 129 hereinafter more particularly described, this bending of the wire into hairpin form occurring as the straight section of wire is drawn lengthwise of the forming groove or channel 81 between the first and second stations. A second feed pawl 131 advances the partially formed link from the second to the third station; a third feed pawl 132 advances the completely formed link beyond the third station, and a fourth feed pawl 133 advances the completely formed link over an upwardly inclined portion 81' of the groove 81. As the straight length of wire illustrated at the left of Fig. 32 is drawn forwardly by the toe of the first feed pawl 128, the end thereof which lies in the groove 126 of the first loop-former swings laterally out of the registering grooves 126 and 127 beneath a horizontal guide 134 (Fig. 9); while the other portion of the wire is pulled out from beneath the springheld guide 74 (Figs. 37 and 39) by a reciprocating hook 135 (Figs. 9, 28 and 36) that is carried by the slide 61. As the wire is drawn forwardly by the first feed pawl 128, the forward portion wipes over the inner end of the slotted core 122 while the rear portion similarly wipes over the inner end of a hardened nose piece 136 on the inner end of the stationary block 67. The folded portions of the wire as they are drawn together are held in properly spaced relation by a pair of upstanding stationary guides 137 and 138 (Fig. 36) and pass between another pair of upstanding guides 139 and 141 carried on one end of a lever 142 that lies in the channel 81 and at its other end is rocked by a device hereinafter described to force the guide-carrying end of the lever 142 upwardly beneath the sides of the hairpin. Simultaneously, a clamp 143, Figs. 21 and 31, carried by a second slide, hereinafter described, is advanced over the hairpin to securely hold the sides of the latter as they are drawn forwardly until the rear or open end portion of the hairpin is properly positioned opposite the first loop-former. On the inner end of the annular body 124 of the loop-former is an arc-shaped projection 144 (Figs. 14 and 15), the advance edge of which, relatively to its direction of rotation indicated by the arrow in Fig. 15, is notched for engagement with the twin limbs of the hairpin; and projecting from the forward face of the core rod 122 is a mandrel 145. The slide block 121 is moved inwardly into working position by a cam 146 on the cam shaft 13 engaging a roller 147 mounted in the rear end of the slide block 121. The roller is held in engagement with the cam and the block retracted when the cam permits by a pair of tensile springs 148, clearly shown in Fig. 9, anchored at one end to a stationary block 149 on the table and at their other ends to an arm 151 secured to and projecting laterally of the slide block 121. The loop-former at this first station is oscillated to effect the formation of the terminal twin wire loop at the rear end of the link by the means best shown in detail in Fig. 13, and consisting of a rack bar 152 slidably mounted on the table 2 and lying within a slot 153 of the slide block 121 of sufficient width to permit the reciprocating movements of the latter. The rack bar 152 is adjustably connected at 154 to a slide 155 carrying at its outer end a roller 156 that is engaged by a cam 157 fast on the cross shaft 18, whereby the loop-former is moved through the working portion of its stroke. The roller 156 is held in engagement with its cam and the rack bar 152 is retracted to move the loop-former back to starting position by a spring 158 (Fig. 13) anchored at one end to the table 2 and at the other to a depending pin 159 on the rack bar 152. The oscillating movement of the loop-former in a contra clockwise direction, viewing Figs. 15 and 31, in cooperation with the stationary mandrel 145 and the straight length of wire that forms the next succeeding link (see Fig. 32) which has been projected beneath and across the hairpin, creates the twin terminal loop a (Figs. 32 to 35 inclusive), throwing both ends of the wire upwardly into substantially vertical position. The wire-bending nose 144 of the loop-former is so shaped as to bend one of the limbs b (Fig. 33) slightly farther than, or in advance of, the other limb which in all except the rear terminal links and the links of one marginal chain, forms the cross arm. At the first station there is also provided mechanism for bending down to horizontal position across the body member of the link the rear upstanding end portion which, as stated, forms the integral cross arm, or, in the case of the marginal and terminal links, is shorter and is tucked under the body member of the link. Before describing this cross-arm bending mechanism, however, we note that the face of the stationary block or anvil 67 is provided with a vertical groove 161, most clearly shown in Figs. 38 and 39, into which the forward or advance limb b comes to rest. Reverting to Figs. 13, 14 and 15, 162 designates a short arm that is pivoted at its lower end at 163 to the forward end of the slide 121 and at its upper end carries a hardened steel block 164 in the face of which is formed a slightly oblique wire-engaging groove 165. On the other side of the arm 162 is a laterally projecting pin or lug 166 that is engaged by the oblique end face 167 of a lever 168 pivoted at 169 to the slide block 121 and having on its other end a roller 171 engaged by a peaked cam 172 fast on the cam shaft 13 alongside the slide-actuating cam 146. The instant the first oscillating loop-former has created the terminal loop a, the cam 172 acts to rock the lever 168, thereby swinging the wire-bending arm 162 forwardly with a quick sharp stroke which bends the rear upstanding terminal portion of the wire down to horizontal position, as shown at c in Figs. 32 and 33; this member constituting the laterally extending cross-arm in the majority of the links, and the terminal portion that is to be tucked under, in the terminal and marginal links illustrated in Figs. 32 to 35 inclusive. The bending arm 162 is returned to normal position by a spring 160 (Fig. 14). Just beyond the high point of the loop-former-actuating cam 157 there is a sharp drop 157' (Fig. 13). This is for the purpose of permitting a quick partial retractive movement of the loop-former nose 144 to get it out of the way of the cross-arm bender 164, the loop-former completing its retracting movement more slowly.

Slidably mounted in a keeper 173 at one side of the stationary block 67 (Figs. 37, 38 and 39) is a rod 174 that is normally maintained in forward position by a stiff spring 175. This rod serves as a yieldable anvil for the block 164 that is carried by the wire-bending arm 162 (Fig. 13), steadying the downward swing of said arm and block. As the wire is bent down by the block 164 it sweeps over the inclined edge of a stationary guide 176, best shown in Figs. 9 and 21, located between the first and second stations, and also over and beneath the nose of a pivoted pawl 177, the free end of which normally abuts against the side of the stationary block 67, the bent down wire end passing thence beneath a horizontal guide plate 178 which holds it in horizontal position during its travel from the first to the second station. By the time the free end of the wire has been thus thrown down to horizontal position beneath the guide plate 178 the first slide block 121 has been retracted, withdrawing the nose and mandrel of the first loop-former from the path of the first feed pawl 128 which travels backwardly to the position illustrated in Fig. 31, wherein it is ready to engage the rear end of the partially formed link and the straight length of wire previously projected into position beneath the two sides of the said link prior to the terminal loop-forming operation on the latter.

The upstanding end portion $b$ is maintained in accurate position to be operated upon by the second loop-former at the second station by a guide which engages it as the feed pawls travel backwardly, this guide consisting, as best shown in Fig. 31, of a vertical strip or plate 179 that is pivoted at 181 to the first feed pawl 128 and is connected by a link 182 to the second feed pawl 131 and has an outwardly bent finger 183 that, during the retracting movement of the feed pawls, passes behind the upstanding wire end $b$, taking it out of the groove 161 of the stationary block 67 and drawing it inwardly to correct vertical position to be acted upon by the second loop-former at the second station.

Figs. 17 to 22 inclusive best illustrate the wire-shaping parts at the second station wherein the rear end of the link is transformed from the form shown in Fig. 33 to that shown in Fig. 34. In these figures 184 designates the second slide block that is mounted on the table 2 transverse to the wire-guiding channel 81 and is normally held in retracted position by a spring 185 anchored to the block 184 at 186 and connected at its other end to a lug 187 on a stationary bracket arm 188. The slide block is forced inwardly at the proper intervals by a cam 189 on the cam shaft 13 engaging a roller 191 on the rear end of the block 184. This slide block 184 is longitudinally cored to receive a rod 192, and rotatably mounted on the rod 192 within an enlarged portion of the bore is a second oscillatory loop former, the body or shank 193 of which is provided with an elongated pinion 194 (Figs. 20 and 21). Both the core rod 192 and the loop-former 193 are capable of rotary movement within the slide block 184; and a limited relative rotary movement between these two members is provided for by a radial pin 195 in the core rod 192 engaging a sector-shaped slot 196 in the loop-former, as shown in Figs. 19 and 20. On the face of the core rod 192 is an eccentric mandrel 197, and on the face of the loop-former body is an eccentric spur 198, the free end of which has a concave wire-engaging edge 199, best shown in Fig. 19. The loop-former is oscillated by a vertical rack bar 201 that is normally urged downwardly by a spring 202 anchored thereto at 203, and anchored at its lower end at 204 to a stationary element of the frame (Figs. 1 and 21). The rack bar is actuated upwardly by a lever 205 (Fig. 21) pivoted at 206 to a bracket 207 on the table 2, said lever having a roller 208 engaging a cam 209 on the cam shaft 13. On one side of the block 184 is a stationary wire guide 211 (Figs. 17 and 18) having an inclined edge over which the free end of the upstanding member $b$ of the wire sweeps as it is bent downwardly, said guide insuring the positioning of said wire end at one side of the body member of the link and preventing interference with the latter. The block 184 also carries a forwardly projecting strip 212 that slides beneath the body member of the link as the guide 211 slides above the same, the two thus forming a clamp or holder for the body of the link during the loop forming operation. To the face of the slide block 184 is also secured a bracket 213 that carries a tapered finger 214 that, as the slide is projected forwardly into working position, enters the terminal loop $a$ of the link, as clearly shown in Figs. 17 and 18, and holds said terminal loop in place during the wire bending operation. The loop-former on its working stroke turns in the direction indicated by the arrows in Figs. 17 and 18 under an upward movement of the rack bar 201 produced by the cam 209. During this movement the hollow loop former body 193 turns relatively to the core rod 192 until the pin 195 has been engaged by the rear end of the slot 196. At that point the upstanding portion $b$ of the wire engages the mandrel 197, and during the remainder of the movement both parts turn together until they reach the position shown in Fig. 18, thereby bending down the upstanding wire end $b$ into the form shown in Fig. 18 and producing the upstanding loop $d$ (Fig. 34). At the conclusion of this operation, the loop-former is oscillated in the reverse direction by the spring 202, and the slide block is retracted by its spring 185 to withdraw the spur 198, mandrel 197, finger 214 and clamp members 211 and 212, from the path of the feed pawl 131. The forward oscillation of the core rod 192 is limited to the position shown in Fig. 18 by means of a radial arm 215 on the rear end of the core rod (Figs. 17 and 21) engaging a stop pin 216 on the rear end of the slide 184.

At this second station the depending free end of the wire beyond the loop $d$ (Fig. 18) is tucked beneath the body member, and, in the case of the terminal and marginal links which omit the cross-arm, the short projecting length of wire is also tucked beneath the body member, as shown in Fig. 34. The mechanism for effecting these operations is best shown in Figs. 21 and 22 and comprises the following parts: Pivoted on the upstanding bracket 217 mounted on the table 2 is a lever 218, to the forwardly projecting arm of which is secured an extension member 219 vertically adjustable by means of a screw 221. Pivotally suspended from the forward end of the extension member 219 is a member 222 having the general character of a push pawl, the rear side of which is normally held in engagement with a roller 223 by means of a spring 224. On the rear side of the pawl 222 is a cam lug 225 which, through engagement with the roller 223 as the pawl descends, gives to the lower end of the pawl a quick inward movement. The lower end or nose of the pawl has a special formation, as shown in detail in Fig. 22, designed to effect the tucking under of both the free end of the wire beyond the loop $d$ and the other short end of the wire in the case of the terminal and marginal links which have no cross arm, and the tucking under of the free end of the wire beyond the loop $d$ only in the case of the cross-arm links. This special formation comprises a forwardly projecting toe portion 226, formed with an inclined front portion 227 at one side to engage the depending vertical free end of the wire beyond the loop $d$, an undercut portion 228 on the other side of sufficient depth to receive the other horizontal short end of the wire, and an intermediate division member 229. The lever 218 is actuated by a cam 231 on the cam shaft 13 engaging a roller 232 on the rear end of the lever 218; the roller being held in engagement with the cam by a spring 233 anchored at 234 to the lever arm and at its other end to the lug 187. When the lever 218 is actuated by its cam 231, the pawl 222 is forced downwardly and inwardly, and the free ends of the wire as shown in Fig. 18 are engaged and both bent beneath the body member, producing the formation illustrated in Fig. 34. In the case of a cross-arm link, the cross-arm is too long to enter the undercut portion 228 of the wire bending pawl 222 and consequently is unaffected by the operation of the latter, the wire of the cross-arm springing to one side during the working stroke of the pawl.

Both the loop-former and the wire tucker at the second station having been retracted, the second feed pawl 131 picks up the chain behind the terminal loop of the link which has just been operated upon at the second station and, in cooperation with the other feed pawls, advances the chain, carrying the link to the third station where the final shaping operations are performed. These operations consist in the flattening down of the vertical loop $d$ to the horizontal position, and the clamping or clinching of the undertucked free ends of the wire, as indicated in Fig. 35. Figs. 23, 24 and 25 show in detail the wire-shaping parts at the third station. Referring to said figures, 235 designates a third transverse slide block carrying at its rear end a roller 236 engaging a cam 237 fast on the cam shaft 13, said roller being normally held in engagement with the cam by a pair of springs 238. On the block 235 is a bracket 239 on which is pivoted a lever 241 carrying at its rear end a roller 242 engaging a cam 243 on the cam shaft 13. To a short depending arm of the lever 241 is secured a bar 244 having a downwardly and forwardly projecting nose 245 that, as the lever 241 is rocked by its cam, wipes down over the upstanding loop $d$ and mashes it down into horizontal position across the body member of the link, as shown in Fig. 24, wherein the loop bender 245 has performed its function and returned to normal position under the gravity of the long arm of the lever 241. At this station also the slide block 235 is provided with a finger 246 that, as the slide comes forward, engages the terminal loop of the link, holding it rigidly in place. Opposite the third station is a horizontal spring finger 247 (Fig. 9) having a hook 248 on the underside of its free end that engages the cross arm of the link near the outer or free end of said cross arm and holds it down while the upstanding loop $d$ is being mashed down. The cross-arm is further held against lateral displacement at the third station by a stationary grooved plate 249 (Figs. 23 and 25). The tucked-under ends of the wire are clinched beneath the mashed down loop $d$ by means of a wedge block 251 on the forward end of the slide block 235 which passes beneath the free upwardly curved end of a spring plate 252 that underlies the tucked-under ends of the wire. An additional wire clamp engaging the body member of the link just in advance of the downwardly mashed loop $d$ consists of a sliding bar 253 carrying at its forward end a presser head 254 that in its forward position overlies the body member of the link, as shown by dotted lines in Fig. 25. The bar 253 is advanced by a cam 255 (Fig. 9) on the cam shaft 13, and is retracted by a spring 256. On the inward movement of the slide block 235 the presser head 254 is pressed down on the body member of the link by a wedge member 257 on the forward end of the slide block 235 that has an inclined lower side that advances crosswise over the presser head and wedges the latter down. The slide block 235 also carries on its forward face a wedge 258, the function of which is to ride over and depress the rear end of the lever 142 that lies in the channel 81 and carries at its forward end the guides 139 and 141 previously described.

Chain feeding mechanism.

Beyond the three link-shaping stations already described the chain is advanced step-by-step along the longitudinal groove 81 of the table until a chain of the full length of the fabric to be made has been formed and advanced to a point beyond the last wire-forming station. We will next more fully describe the mechanism by which the chain is intermittently stepped along the groove 81. The bar 129, previously mentioned, is mounted to reciprocate in suitable guides 259 (Figs. 31 and 41) above and slightly to one side of the groove or channel 81. This bar carries the pivoted feed pawls 128, 131, 132 and 133, already described, the noses of these pawls being normally held down to their work by springs 261 (Fig. 31), and their downward movement being limited by lugs 262 on the pawls engaging stops 263 on the bar 129. The pawl 133 carries a pivoted nose-piece 133' which operates over the upwardly inclined portion 81' of the channel 81; and said pawl is further provided with a forwardly projecting finger 133ª that operates as a guard to prevent the flying up of the forward or advance end of the first link of the chain. Beyond the pawls 128, 131, 132 and 133 the reciprocating bar 129 is provided with a plurality of chain-advancing pawls 264 pivoted to the bar at 265 and normally held in chain-engaging position by springs 266 (Figs. 31 and 44), the downward movement of the pawls 264 being limited by stops 267. The mechanism for reciprocating the bar 129 is shown in Figs. 1, 2, 3 and 9, wherein 268 is an eccentric on the shaft 18 carrying an eccentric rod 269, the lower end of which is connected to one arm 271 of an elbow lever that is mounted on a rock shaft 272 journaled in depending brackets 273 carried by the table 2. The upwardly extending arm 274 of the elbow lever carries a thrust bar 275 the free end of which abuts against the adjacent end of the reciprocating bar 129, as best shown in Fig. 1, forming therewith an arc-shaped sliding joint 276. The other end of the reciprocating bar 129 is adapted to strike a bumper 277 (Fig. 10); and the arm 274 of the elbow lever further carries a pivoted rod 278, the free end of which slidingly engages a guide lug 279 on the bar 129, and on said rod 278 is a compression spring 281. As the elbow lever oscillates on its inward stroke it positively advances the bar 129 throughout the working stroke of the feed pawls until the other end of said bar engages the bumper 277. At that instant the thrust bar 275 slides off and beneath the cooperating end of the bar 129, and the spring 281 permits a further inward swing of the elbow lever, the compression of said spring holding the reciprocating bar 129 securely in its advanced position and preventing any rebound or endwise vibration until the bar is retracted, which latter movement is effected by a link 282 pivoted at 283 to the bar 129 and having a lost motion connection at 284 with the upstanding arm 274 of the elbow lever.

Additional chain-holding devices which serve to hold the chain down in the guide-groove or channel 81 during the backward or retracting movement of the pawls consist of pivoted keepers 285, best shown in Fig. 36, the free ends of which are normally urged to a position above the chain in the groove 81 by springs 286. On the advance movement of the pawls the free ends of these keepers are simply pushed out of the way, and as soon as the noses of the feed pawls have passed the free ends of the keepers, the latter snap back under the action of springs 286 to a position overlying the body members of the links. The principal means for holding the chain at each step of its advance movement against endwise movement during the return movement of the pawls consists of a series of transversely reciprocable rods or bars 287, best shown in plan view in Figs. 10 and 45, which bars have the further function of transfer bars to shift the completely formed chain laterally into position for being connected onto the previously formed portion of the fabric. The bars 287 are slidably mounted in guides or keepers 288 on the main bed or table 2 and at their forward ends are provided with heads 289, the specific structure of which is best shown in the detail view, Fig. 42, each head comprising a flat piece 291 that, in the chain-engaging position, overlies the body member of a link, a pointed finger or spur 292 that enters the terminal loop of each link, as clearly shown in Fig. 45, and a downwardly struck finger 293 that travels in a transverse groove 294 of the table 2 and underlies the body of the link. These combined chain-holding and transfer bars receive a short reciprocating movement between successive adavance movements of the chain as the latter is drawn out. Fig. 10 illustrates the forward or advance position of these members when engaging the chain in the groove 81 to hold the same against endwise movement; and Fig. 45 shows the advance position of these same members when, after a complete chain has been formed, the chain is shifted laterally to be operated upon by the fabric-assembling mechanism. The means for operating these chain-engaging devices in the performance of their chain-holding function consists of the following parts.

Suitably journaled above the rear side of the table 2 is a rock shaft 295 (Figs. 10 and 43) on which are keyed a series of depending arms 296, the lower ends of which have a pin and slot connection at 297 with the bars 287. The shaft 295 is rocked in a direction to shift the bars 287 to work-holding position by a cam 298 (Fig. 43) on the cam shaft 13 which cooperates with a roller 299 on the lower end of a depending arm 301 fast on the rock shaft 295; and the shaft 295 is rocked in the reverse direction to retract the bars 287 from work-holding position by another cam 302 (Figs. 2 and 7) acting upon a roller 303 carried on the lower end of a link 304 that, in turn, is pivoted at its upper end to the lower end of a depending arm 305 fast on the rock shaft 295, and at its lower end to an arm 310 loose on a shaft 423, hereinafter referred to.

Since, during the link-shaping operation at the first station upon the last link of a chain the wire feed is omitted, as already described, and there is no straight wire (such as is shown at the left of Fig. 32) around which to form the terminal loop $a$, in order that this terminal loop may be of full normal size, it is necessary to provide a false or dummy wire at this period of the chain-forming operation. The mechanism for doing this comprises the following parts: Referring more particularly to Figures 3, 9 and 36 to 40 inclusive, 306 designates a block, shown in detail in Fig. 40, that is slidably mounted between a guide 307 and one side of the stationary block 67, and has mounted in one side thereof a forwardly projecting upwardly extending false wire 308, the free end of which has an elastic bearing in a groove 309 (Fig. 37) formed on the underside of the wire guide member 68. To the rear end of the block 306 is connected a relatively long and transversely flexible rod 311 that extends lengthwise of the wire feed mechanism, as best shown in Fig. 3, and carries at its outer end an adjustable collar 312 that is attached by an expansion spring 313 to a lug 314 carried by the stationary bracket 28. Adjustably mounted on the rod 311 is a collar 315 (Fig. 9). The pivoted bar 113 has an upwardly turned free end 113′ (Figs. 3 and 9) that, when said bar is rocked inwardly by the pin 119 in the manner previously described, pushes the rod 311 laterally sufficiently to carry the collar 315 into the path of the wire carriage 31. When, therefore, the wire feed carriage on its idle movement between the last link of one chain and the first link of the next chain strikes the collar 315, the slide block 306 is advanced, carrying the false wire 308 across the rear end of the partially formed last link of the chain and into the first loop-former, thereby taking the place and serving the mandrel function of the newly introduced section of wire, such as is shown at the left of Fig. 32 and cooperating with the permanent mandrel 145 at the first link-forming station to form a full sized terminal loop $a$ on the rear end of the last link of each chain. As soon as the wire feed carriage starts back, the spring feed 313 retracts the false wire; and the same remains idle until the formation of the last link of the next chain.

*Chain transfer mechanism.*

When a complete chain has been run out in the groove or channel 81, it is bodily transferred laterally to a parallel groove or channel 316 closely adjacent to one edge of the top of the table 2, in which position the chain is connected onto the previously formed portion of the fabric. This lateral shifting of the chain is effected by the transfer bars 287 and their heads 289; and the mechanism for effecting the movement of the transfer bars to carry the chain from groove 81 to groove 316 consists in means for imparting to the rock shaft 295 and the arms an excess movement over the limited movement of said parts in shifting the transfer bars into and out of work-holding position. Referring to Figs. 9, 26 and 29, on one face of the disk 86 is a laterally projecting pin 317 which, as said disk is stepped around once during the formation of each chain, engages and lifts one end of a lever 318 that is pivoted at 319 to a stationary element of the frame and carries at its other end a pin 321 that extends through a hole in the free end of a crank arm 322 fast on an endwise movable rock shaft 323 suitably mounted above the table of the machine and parallel with the shafts 13 and 295. Fast on the shaft 323 is an oppositely extending crank arm 324 carrying a pin 325 that extends through a hole in the upper end of a link 326, which link is pivotally connected to a disk 327 that is loosely mounted on the shaft 295. Fast on the shaft 295 and lying alongside the disk 327 is another disk 328 of the same diameter and formed with a peripheral notch 329. The loosely mounted disk 327 also has a peripheral notch 331 that is normally out of register with the notch 329, as shown in Fig. 26. On the cam shaft 13 is a cam 332 that, once during each rotation thereof, engages a roller 333 on the lower end of an arm 334 hung on the shaft 295.

The arm 334 carries a pivoted drag pawl 335, which pawl in turn carries a roller 336 engaging the periphery of the loosely mounted disk 327, being held in engagement therewith by a spring 337. The arm 334 is normally held in the position shown in Fig. 26 by a spring 338 connecting said arm to a pin 339 mounted in the hub of the disk 328. Referring to Fig. 10, surrounding the shaft 323 is a coil spring 341 one end of which is anchored to a collar 342 on the shaft and the other end of which is anchored to one of the stationary shaft bearings 343. This spring operates both as a torsion and as a compression spring. As a torsion spring, it normally maintains the shaft 323 and the arms 322 and 324 carried thereby in the relative positions indicated in Figs. 9 and 26. As soon as a complete chain has been run out in the groove 81 and is ready to be transferred to the groove 316, the pin 317 carried by the disk 86 swings the lever 318, thereby rocking the shaft 323 in a clockwise direction, viewing Fig. 26, thereby, through arm 324, pin 325 and link 326, oscillating the disk 327 to bring the notch 331 thereof into register with the notch 329 of the disk 328. This permits the drag pawl 335 to drop into the notch 329 so that when the cam 332 next engages the roller 333 the shaft 295 is rocked through an angle sufficient to actuate the transfer bars and the chain carried thereby over to the assembling groove 316. At all other times the engagement of the pawl roller 336 with the periphery of the guard disk 327 prevents the drag pawl 335 from thus rocking the shaft 295, so that at all times except when the chain is to be shifted, the arm 334 merely swings idly under the throw of the cam 332. The rock shaft 323 is returned to normal position by the spring 341, while the cam 302 serves to return the shaft 295 to normal position.

By reference to Figs. 26 and 45 it will be noted that the first of the series of transfer bars, that is, the one nearest the link-forming stations, is shaped slightly differently from the remainder of the series, having a relatively long head plate 289', with an upwardly turned forward edge portion 291 that, in the chain-engaging position, overlies the body member of a link, while the pointed finger or spur, 292', that enters the terminal loop of the link is somewhat shorter than the corresponding fingers of the series. This foremost chain-holding and transferring device is not actuated by one of the depending arms 296 but, having a slightly shorter reciprocatory movement, is actuated by independent mechanism clearly shown in Fig. 26, and comprising a depending arm 344 fast on the shaft 295, a depending arm 345 loosely hung from the shaft 323 and pivotally connected at 346 to the shank 287', and a connecting link 347 between the depending arms 344 and 345.

In order to securely retain the chain in the bed or channel 316 during the withdrawal movement of the transfer devices, there is provided a bar 348 (Figs. 1, 10, 43, 45, 46 and 55) overlying the bed or channel 316 and provided on its underside, as clearly shown in Figs. 46 and 55, with lugs 349 adapted to rest upon the body portions of the links of the chain. The bar 348 is pressed downwardly by springs 351, one at each end.

*Fabric assembling mechanism.*

Each cross-arm chain, as soon as it has been transferred from the chain-forming groove 81 to the fabric-assembling groove 316, where it is held by the spring-pressed bar 348, with its cross-arms projecting over the adjacent edge of the top of the table, is acted upon by a series of wire-bending and loop-forming devices engaging the cross-arms by which the latter are passed through the lateral eyes of the preceding chain and are permanently connected flexibly to the latter. This preceding chain is held upon a movable holder for a chain that, in turn, is mounted upon a skeleton frame that is pivoted alongside the edge of the main table and is capable of a limited up and down rocking or tilting movement relative to the latter. This pivoted skeleton frame is further equipped with chain-transfer mechanism consisting chiefly of hook devices which, when a chain in the channel 316 has been joined on to a chain on the movable holder, reach beneath said chain in the channel 316 and raise and shift it laterally on to the chain holder, and remove the preceding chain on said holder from the latter.

Proceeding now to a detail description of this fabric-assembling mechanism, it will be observed by reference to Figs. 10 and 44 to 46 inclusive, that the longitudinal edge of the table in which the channel 316 is formed is provided at intervals with notches 352 and with forwardly projecting tongues 353 on the inner ends of said notches. The edge wall of the table intermediate said notches is provided with a series of forwardly projecting anvils or mandrels 354 around which the terminal loops of the cross-arms are formed. On the table 2 is mounted a series of brackets 355, (Figs. 26, 41 and 43) overhanging the grooves 81 and 316 and terminating in depending heads 356 that provide slideways for several of the wire-engaging devices, hereinafter described. Journaled in brackets on the rear side of the heads 356 is a rock shaft 357 fast on which are a series of rectangularly bent forwardly projecting arms 358, each of which has formed in its lower edge near its free end a notch 359, as best shown in Figs. 44, 46 and 47. These notched arms 358 constitute a means for bending the terminal portion of the cross arm wire upon the anvil 354, preliminary to the insertion of the bent end of the wire through the lateral eye of the preceding chain, this bending being accomplished by a downward swing of the arm 358 to the position indicated in Fig. 47 and by dotted lines in Fig. 46, the notch 259 of the arm engaging the terminal portion of the cross-arm wire and bending it upon the anvil 354 to a substantially vertical position. The rock shaft 357 is actuated to effect the downward or working stroke of the arms 358 by the mechanism best illustrated in Figs. 9 and 26, and comprising the following instrumentalities. On the inner end of the head cam shaft 25 (which is journaled in vertical extensions of the bracket 355) is a cam 361 that cooperates with a roller 362 extending laterally from a link 363, which link is pivoted at its lower end to an upwardly extending arm 364 fast on the rock shaft 357. The upper end of the link 363 has a longitudinal slot 365 that slidably engages a pin 366 carried by a curved arm 367 loosely mounted on the shaft 295, and hereinafter described. The cam 361 turns in the direction indicated by the arrow, Fig. 26, and when it strikes the roller 362, it swings the arm 364 downwardly and forwardly, thereby similarly swinging the wire-bending arms 358. The arms 358 are returned to elevated position after performing their function on the wire by a spring 368 anchored at one end to the pivot pin 369 which connects the link 363 and the arm 364 and at its other end to a vertical connecting rod 371 that connects the arm 367 with an arm 372, hereinafter referred to. A hand lever 370, constituting an extension of the arm 364, enables the wire-bending arms 358 to be actuated by hand if desired or necessary; and an arm 380 (Fig. 10) on the other end of rock shaft 357 cooperates with a stationary frame portion to limit the downward swing of the arms 358.

Each head 356 constitutes a vertical slideway for two wire-engaging devices, each of which is operated by independent cams. One of these wire-engaging devices consists, as best shown in Fig. 41, of a vertical slide 373 that is formed with a rectangular notch 374 on its lower end and, on its rear side, with an offset depending limb 375, in the lower end of which is mounted a spring-backed presser foot 376. In the fully lowered position of the slide 373 the notch 374 engages the wire of the cross-arm at the bend or angle thereof overlying the anvil 354, as clearly shown in Figs. 47 and 48, and serves the double function of sharply defining and fixing the bend, and holding the wire down during a subsequent further bending operation. The presser foot 376, which is provided with a serrated lower end as shown in Fig. 47, clamps the wire inwardly of the bend and holds it securely against upward or lateral displacement. The slide 373 is actuated on its downward stroke by a cam 377 (Fig. 41) fast on the head cam shaft 25 engaging a roller 378 carried by one arm 379 of a bell crank lever pivoted at its elbow on a pivot shaft 381, the other arm 382 of said bell crank lever engaging the upper end of the slide 373. A spring 383 confined between the lever arm 382 and the top of the bracket 355 causes the roller 378 to hug the cam 377 and effects the upward return movement of the slide 373 as soon as permitted by the cam.

The terminal portion of the cross-arm wire, having been bent downwardly and clamped in position by the means last described, is entered through the lateral loop $d$ of a link in the previously formed chain by the following instrumentalities. Pivoted at 384 in brackets 385 (Figs. 9, 10 and 26) on the main frame is a skeleton frame which carries various devices that cooperate with parts already described in effecting the assembling. The principal element of this skeleton frame consists of a comparatively wide bar 386, in the upper surface of which are formed a series of uniformly spaced transverse channels 387 each of which, as best shown in Fig. 10, is tapered longitudinally, being formed with a straight side and an opposed oblique side for a purpose hereinafter disclosed. The bottom wall of each channel is also slightly downwardly inclined from its outer to its inner end, as clearly shown in Figs. 41 and 46. Disposed in each of these channels, and connected to the main frame bar 386 by a pivot pin 388 is a transverse bar 389, a top plan view of which is shown in detail in Fig. 52. The shanks of the bars 389 which lie within the transverse grooves 387 are covered by a removable guard plate 390 secured in place by screws 391, Figs. 9 and 10 and at their inner or forward ends the bars 389 are formed with transverse chain-receiving pockets or channels 392, as most clearly shown in Figs. 52 and 53, these bars together constituting a holder for a chain. Pivoted to a depending extension 393 on the forward end of each of the bars 389 (Figs. 46 and 53) is a curved arm 394 formed with a horizontally turned upper end that is apertured to provide a funnel guide 395 for the depending portion of the cross-arm wire. When the arm 394 is in its fully raised position, as shown in Figs. 46 and 53 and by full lines in Fig. 49, the funnel guide 395 directly overlies the lateral loop or eye $d$ of a link of the previously formed chain; so that, as the pivoted frame swings upwardly from the full line position, the lower end of the cross-arm wire is directed by the said funnel guide into and through the said lateral eye of the previously formed link, in the manner clearly illustrated in Fig. 49; it being noted that the funnel guide has on one side a lateral slot 396, best shown in Fig. 54, which permits the guide to move away from the wire after the latter has passed therethrough. This last mentioned movement of the guide arm 394 is effected by the means best shown in Fig. 41, wherein it will be seen that the arm 394 is connected by a rod 397 with an underlying bracket 398, the rod 397 being encircled by a compression spring 399. When the frame tilts downwardly to the position illustrated by full lines in Fig. 46, the spring 399 forces the funnel guide into operative position, and this position is maintained during the upward tilting movement of the frame until after the lower end of the cross-arm wire has been centered by the guide and entered through the lateral loop. The further final upward tilting movement of the frame causes the guide arm 394 to be drawn backwardly and downwardly and out of the way of the loop-former, hereinafter described. Secured to and depending from the edge of the table 2 is a bracket 400 carrying an upstanding finger 410 (Fig. 7) over which the end link of the chain carried by the bars 389 is passed to prevent any lateral displacement of said end link with consequent displacement of its lateral loop from correct position to receive the downwardly bent end of the cross-arm that is to be articulated thereto. By reference to Figs. 46 and 49, it will be noted that on the extreme forward end of each chain holder bar 389 is an inclined cam surface 401 which, acting on the vertical depending portion of the cross-arm wire during the last part of the upward swing of the frame, gives to the wire a pronounced inward bend as shown by dotted lines in Fig. 46 so that the depending end of the wire is brought into a position to be acted upon by the cross-arm loop-former hereinafter described. It may here be noted, however, that, for a purpose hereinafter disclosed, each of the bars 389 is supported toward its forward end by a pin 402 slidably mounted in a hole in the main frame bar 386, the lower end of said pin being stepped upon a strong leaf spring 403, as most clearly shown in Fig. 46.

Describing next the mechanism for rocking or tilting the skeleton frame and the parts carried thereby, and referring principally to Figs. 6, 7 and 10, on the head cam shaft 25 are a pair of cams 404 and 405 that engage rollers 406 and 407, respectively, carried by a reciprocating connecting rod 408, this latter being pivoted at 409 to an upstanding bracket 411 mounted on the main frame bar 386.

The terminal loops of the cross-arms are created by a series of loop-formers that are generally similar to the device which creates the terminal loop on the rear end of each link at the first link-forming station. These loop-formers are best shown in Figs. 41 and 43 to 50, and each comprises a wire-engaging head 412 on the outer end of a spindle 413, which latter, as shown in Fig. 41, is journaled in and crosswise of the main table top 2 of the machine frame, with the head 412 projecting from the fabric-assembling edge of the table top adjacent to one of the mandrels 354. The forward edge of the head (with reference to its direction of rotation during its working movement) is formed with a wire-engaging notch 414, and its outer edge has an inwardly inclined portion 415 that affords clearance space for the loop during the final part of the loop forming movement of the head. The actuating mechanism for this loop-former is best shown in Fig. 41 and comprises a pinion 416 on the inner end of spindle 413, a vertical rack bar 417 slidably mounted in the bracket 355 and table top 2, and a roller 418 engaging the periphery of a high-peak cam 419 mounted on the head cam-shaft 25, the cam 419 effecting the working stroke of the loop-former under a down stroke of the rack-bar 417. The return or idle movement of the loop-former takes place upon a rising movement of the rack-bar 417, which is effected from a pair of cams 421 (Figs. 7, 9, 10 and 26) on the head cam shaft 25. The cams 421 engage rollers 422 carried by arms 367 that are loose on the shaft 295, and the arms 367 are connected by the adjustable links 371 to the arms 372. These arms 372 are fast on a rock shaft 423 that is journaled in bearing brackets 424 on the rear side of the machine; and fast on this rock-shaft are a series of forwardly projecting arms 425 on the free ends of which are stepped sleeves 426 that are fastened at 427 to depending rod-like extensions 417′ of the rack-bars 417. Springs 428 housed in the sleeves 426 and stepped on the arms 425 hold the rollers 418 against the peripheries of the cams 419. It will thus be seen that the cams 421, which have a deep concave to permit the downward actuation of the rack-bars 417 by the high-peak cams 419, operate, through the described connections, to rock the shaft 423 and through the arms 425 raise the rack-bars 417 and thus return the loop-formers 412 to initial or starting position.

The loop-former 412 oscillates through something more than 180 degrees, and forms the terminal loop of the cross-arm around the mandrel 354, as best shown in Fig. 50, which shows the loop-former at the limit of its working stroke. It now remains to force down below the plane of the upper surface of the fabric the free end portion of the cross-arm wire that forms the terminal loop, and to clinch the same on the cross-arm. This is accomplished by the other of the two wire-engaging devices that are slidably mounted in each of the heads 356. Referring to Figs. 41, 43, 44, 46 and 51, 429 and 431 (Fig. 44) designate a pair of jaws slidably mounted in the head 356 and terminating at their lower ends in inwardlly turned beaks or pinchers 429' and 431', respectively. The longer jaw 429 has a lateral extension 432 that drivingly engages the upper end of the shorter jaw 431, and the latter is articulated to the jaw 429 at 433. On the outer edge of jaw 431 is a cam incline 434 that, as the jaw descends, forcing down the terminal portion of the cross-arm wire, rides over a lug 435 in a wall of the slideway 356 and thus forces the beak 431' inwardly thereby clinching the end of the cross-arm wire on the body of the cross-arm, as shown in Fig. 51. A spring 436 connected at one end to the upper end of jaw 431 and at its other end to the lateral extension 432 of jaw 429 normally holds the jaw 431 in the retracted position shown in Fig. 44. The jaws 429 and 431 are actuated on their downward or working stroke by a cam 437 on the head cam shaft 25 engaging a roller 438, Fig. 43, carried by one arm 439 of a bell-crank lever pivoted on the shaft 381, the other arm 441 of said lever being articulated at 442 to the upper end of jaw 429. A spring 443 returns the jaws to elevated position.

By the mechanism above described a chain, after it has been run out and transferred to the channel 316, is connected onto a chain on the movable holder. The newly connected chain is then transferred onto the movable chain holder by a series of hooks which raise it out of the channel 316 and deposit it in the grooves or seats 392 of the chain holder bars 389. This latter transfer mechanism comprises the following instrumentalities.

Slidably mounted on and crosswise of the main frame bar 386 are a series of bars 444 (Figs. 10 and 43) that are connected at their outer ends to a cross-bar 445. To the inner end of each bar 444 is connected a pair of upwardly turned hooks 446. Secured to and depending from the forward or inner end of each bar 444 is a bracket 447 that carries an upstanding leaf spring 448, the free upper end of which lies between the hooks 446 of each pair, as clearly shown in Fig. 43. Mounted on and parallel to the bar 445 is another cross-bar 449 carrying a series of downturned hooks 451. The function of the hooks 446 is to engage beneath and behind the newly formed chain lying in the channel 316, after said chain has been connected to a chain on the chain holder, raise it out of the channel, and draw it over into the seats 392 of the chain-holder bars 389, while the function of the hooks 451 is to engage over and behind the previously formed chain lying in the seats 392 of the chain-holder and remove it from the latter. To these ends means are provided for reciprocating the two series of hooks and their supporting means, as follows: Referring to Figs. 1, 6, 7, 9, 10, 26 and 41, 452 designates a rock-shaft journaled beneath the table 2, fast on which are a pair of upstanding arms 453, the upper ends of which are connected by curved links 454 to the ends of the cross-bar 445. On one end of rock shaft 452 is an arm 455 (Figs. 6 and 10) to which is connected a reciprocating connecting rod 456, mounted on opposite sides of which are rollers 457 and 458 that engage cams 459 and 461 respectively, fast on the head cam shaft 25. The cam 459 actuates the hook-carrying frame inwardly, and the cam 461 actuates the same outwardly.

Before the fabric can be shifted as above described it is, of course, necessary to withdraw the terminal loops of the cross-arms from the mandrels 354 on which they are formed. For this purpose the chain holder bars 389 are pivoted at 462 (Fig. 10) to an underlying cross-bar 463, which latter is connected by a link 464 to a crank arm 465 fast on a cross-shaft 466 (Fig. 1), said shaft having fast thereon an upstanding arm 467, carrying rollers 468 and 469. On the side of the frame-tilting cam 405 is a cam lug 471 that engages roller 468 to swing the holder bars 389 to the left, viewing Fig. 10, to carry the cross-arm loops off the mandrels and on the opposite side of the gear 24 is a cam lug 472 that later engages roller 469 to return the holder bars to normal position.

When the hooks 446 have engaged the newly formed chain lying in the channel 316 and just before said hooks are retracted a slight extra upward tilt is given to the frame in order to raise the chain out of the channel. This is effected by means of a small lug or protuberance 473 on the working face of the frame-rising cam 405 (Figs. 7 and 10). During this extra movement the springs 403 yield and prevent the forward ends of the bars 389 from breaking or bending the mandrels 354. As the hooks 446 are withdrawn, bringing the chain with them, they engage cam inclines 474 (Figs. 46 and 55) on the lower side of the clamp bar 348, thereby raising said bar sufficiently to permit the hooks and chain to pass. It may here be noted that as the hooks 446 advance to engage the newly formed chain the spring latch or keeper 448 (Fig. 43)

snaps out beneath the previously formed chain held in the seats 392 and engages the advance side of the newly formed chain to lock the latter in engagement with the hooks 446. At the same time that the newly formed chain is lifted out of the channel 316, the previously formed chain is raised out of the grooves 392 of the holder bars 389 by devices shown in Figs. 10, 41 and 46 and comprising a series of fingers 475 each pivoted at 476 to a side of a bar 389, the free end of the finger extending to the forward end of the bar. On one side of the finger is a lip 477 that overlies the bar 389 and forms a stop to limit the downward pull of a spring 478 (Fig. 41), and on the other side is a laterally projecting cam lug 479. When the bars 389 are angled sidewise, as above described, the cam lug 479 rides up over the stem or shank of the laterally adjacent hook 446, thereby lifting the forward end of the finger and, through the latter, raising the chain out of the seats or grooves 392 so as to be engaged and drawn outwardly of the frame by the hooks 451.

Describing next the means for effecting intermittent rotation of the head cam shaft 25, this is effected by a clutch mechanism controlled by an endwise movement of the rod 323 (Figs 8 and 10). Fast on the shaft 25 is a brake disk 483, on one side of which is a pivoted pawl 484 the nose of which is urged into engagement with a notched hub 485 on the large gear 24 (this latter being loose on the shaft 25) by a spring 486. A roller 487 on the shaft 323 normally overlies the tail-piece of the pawl 484 and holds the latter disengaged from the hub of the gear 24, the roller 487 being held in the plane of the pawl by the spring 341 (Fig. 10). At the completion of the formation of each chain the rod 323 is shifted endwise to carry the roller 487 off the tail-piece of the pawl 484 by means best shown in Figs. 1, 9, 29 and 30 and comprising a lever 488 pivoted at 489 to a stationary element of the frame and connected at one end to the rod 323, the other end of said lever having a curved extension 491 adapted to be wiped over by the pin 317 on the disk 86 once during each rotation of said disk. As soon as the roller 487 is thus shifted from the tail-piece of the pawl 484, the latter instantly clutches with the hub of the continuously turning gear 24. The roller 487 at once moves back into the plane of the pawl so that, at the completion of a single rotation of the shaft 25 the pawl is disengaged from the hub of the gear 24 by the roller and the shaft 25 remains idle until the rod 323 is again shifted endwise, as described.

The brake disk 483 is engaged by a spring-pressed brake 492 (Figs. 6 and 10) to prevent any overthrow or rebound of the cam shaft 25 when the driving clutch thereof is released. While the organization shown and described adapts the machine to the production of the particular fabric illustrated in Fig. 56, it is manifest that with slight detail changes and modifications the principle of the machine may readily be adapted to the production of other fabrics of the same general type but differing in the detail form or shape of the individual links. We do not, therefore, limit the invention to the specific embodiment thereof, herein disclosed for purposes of illustration, but reserve all such modifications as fall within the spirit and scope of the appended claims.

We claim:

1. In a wire link fabric machine, the combination of chain-forming mechanism operative to form and directly interloop identical two-ply links, and mechanism serving to simultaneously interloop a plurality of links of one chain with a plurality of links of an adjacent chain.

2. In a machine for making wire fabrics, the combination with mechanism for simultaneously forming and connecting adjacent links of a chain, of mechanism for connecting completely formed chains laterally to each other.

3. In a wire link fabric machine, the combination of mechanism for simultaneously forming and connecting adjacent links of a chain, and mechanism for simultaneously uniting a plurality of the links of a previously formed chain with a plurality of the links of a previously assembled portion of the fabric.

4. In a wire link fabric machine, the combination of mechanism operating to bend the wire into the form of two-ply links having cross arms and simultaneously connect said links in chain form, and mechanism serving to connect the cross-arms of each chain to the previously formed chain.

5. In a wire link fabric machine, the combination of means for forming and connecting links having a two-fold member, means for forming an arm with a free end on said two-fold member, and means for simultaneously connecting a plurality of said links to a plurality of adjacent links to form a fabric.

6. In a wire link fabric machine, the combination of means for shaping and connecting links having a two ply member, means for forming an arm having a free end on said two ply member, means for disposing the chain thus formed in parallel lengths, and means for simultaneously connecting the arms of one parallel length to the links of an adjacent parallel length.

7. In a wire link fabric machine, the combination of means for shaping and connecting links having a two ply member, means for forming an arm having a free end on said two-ply member, means for disposing the chain thus formed in parallel lengths, and means for connecting the arms of one parallel length to the links of an adjacent parallel length.

8. In a wire link fabric machine, the combination of means for shaping and connecting links having a two ply member, means for forming an arm on said two-ply member disposed externally of the latter, means for disposing the chain thus formed in a succession of unconnected chains of predetermined length, and means for connecting said chains laterally to one another.

9. In a wire link fabric machine, the combination of mechanism for feeding lengths of wire, means for folding said lengths of wire upon themselves and forming them into links having a two ply member, means for forming an arm with a free end on and disposed externally of said two ply member, means for forming a link-connecting element connecting said two ply member and arm and connecting the end of a two ply member of one link to the said link-connecting element of an adjacent link to form rows of connected links, and means for connecting the arms of one of said rows to the links of a laterally adjacent row.

10. In a wire link fabric machine, the combination of means for forming parallel rows of connected links each comprising a two-ply body member and a closed loop lying in the plane of said body member, means for anchoring a free end of the wire beyond a link-connecting element to a body member to secure the connected links of each row against separation or slip under strain, and means for connecting the links of one row to the links of an adjacent row to form a fabric.

11. In a wire link fabric machine, the combination of means for forming parallel rows of connected links each comprising a pair of body members, means for anchoring a free end of the wire beyond a link-connecting element to a body member to secure the connected links against separation under strain, and means for simultaneously connecting the links of one row to the links of an adjacent row to form a fabric.

12. In a wire link fabric machine, the combination of means for forming rows of connected identical links each having limbs disposed at an angle to each other, means for directly connecting the links of one row to the links of an adjacent row, and means for anchoring the free ends of the wires beyond the link-connecting elements to secure the links against separation under strain.

13. In a wire link fabric machine, the combination of means for forming parallel rows of connected links, means for anchoring a free end of the wire beyond a link-connecting element to secure the connected links of each row against separation under strain, and means for simultaneously connecting the links of one row to the links of an adjacent parallel row.

14. In a wire link fabric machine, the combination of means for forming parallel rows of connected links, means for anchoring a free end of the wire beyond a link-connecting element to secure the connected links of each row against separation under strain, and means for connecting adjacent rows.

15. In a machine for making wire fabrics, the combination with mechanism for forming the body portions of identical links, of means for forming a loop at one end of each of said body portions, means for anchoring the free end of the wires beyond said loops to secure said links against separation under strain, and means for connecting said links to form a fabric.

16. In a wire link fabric machine, the combination of wire feed mechanism, means for forming and directly interlooping identical units to form chain, means controlling said wire feed mechanism, whereby said chain is delivered in the form of individual unconnected chains of predetermined length, and means for uniting said chains laterally to one another.

17. In a wire link fabric machine, the combination of mechanism for shaping and interlooping lengths of wire to form chain composed of identical links, means for disposing said chain in parallel lengths, and means for directly interlooping the links of one parallel length with the links of an adjacent parallel length.

18. In a wire link fabric machine, the combination of mechanism for shaping identical links each having limbs disposed at an angle to each other and a link-connecting element connecting said limbs, and interlooping one of said identical links with the link-connecting element of an adjacent identical link to form chain, means for disposing said chain in parallel lengths, and means for interlooping the identical links of one parallel length with the identical links of another parallel length to form a fabric.

19. In a wire link fabric machine, the combination of mechanism operating to bend the wire into the form of two-ply links having oppositely extending lateral eyes and cross-arms and connect said links in chain form, and mechanism serving to loop the cross-arms of each chain through the lateral eyes of the previously formed chain.

20. The combination of mechanism for forming and connecting adjacent links of a chain, means for anchoring a free end of the wire beyond a link-connecting element to prevent separation of the links under strain, and mechanism controlling said link forming and connecting mechanism so as to produce successive unconnected chains.

21. The combination of mechanism for shaping and interlooping lengths of wire to form chain composed of identical links, means for forming cross-arms on said links, and mechanism controlling said link forming and connecting mechanism so as to produce successive unconnected chains of predetermined length.

22. In a machine for making wire link fabric chain, the combination of link and chain forming means, including mechanism for feeding lengths of wire, mechanism for shaping said lengths of wire to constitute partly formed links each comprising a pair of body members, and mechanisms operating to shape free end extensions of one end of the said body members into link-connecting elements and a cross arm constituted of a continuation of one of said link-connecting elements and to unite the said link-connecting elements of one link with an end of an adjacent link to form a chain.

23. In a chain making mechanism, the combination of means for feeding lengths of wire, means for shaping said lengths of wire to form link elements and connecting the latter into chain form, means for forming a loop on one side of said elements, and for forming an arm on the other side of said elements.

24. In a chain making mechanism, the combination of means for feeding lengths of wire, means for shaping said lengths of wire to form two ply link elements and connecting the latter into chain form, means for forming a loop on one side of said elements, and means for forming an arm on the other side of said elements.

25. In a chain making mechanism, the combination of means for feeding lengths of wire, means for shaping and connecting said lengths of wire to form a chain comprising links having a two-fold member, and means for forming an arm on said two-fold member disposed externally of the latter.

26. In a machine for making wire link fabric chain, the combination of link and chain forming means, including mechanism for feeding lengths of wire, mechanism for shaping said lengths of wire to constitute partly formed links each comprising a two-ply body member having an open end, and mechanisms operating to form link-connecting elements and a cross arm on said open end and unite the said link-connecting elements of one link with the opposite end of an adjacent link to form a chain.

27. In a chain making mechanism, the combination of means for feeding lengths of wire, means for shaping and connecting said lengths of wire to form chain, and means for anchoring a free end of the wire forming the links of the chain against displacement under strain.

28. In a chain making mechanism, the combination of means for feeding lengths of wire, means for shaping and connecting said lengths of wire to form unconnected chains, means for predetermining the number of links in each chain, and means for anchoring a free end of the wire forming the links of a chain against displacement under strain.

29. In a chain making mechanism, the combination of means for feeding lengths of wire, means for shaping and connecting said lengths of wire into chain comprising identical links each having limbs extending at an angle to each other, and means for anchoring a free end of the wire forming the links of a chain against displacement under strain.

30. In a chain making mechanism, the combination of means for feeding lengths of wire, means for shaping and interlooping said lengths of wire to form chain comprising identical links having a two-fold member, means for forming an arm on said member, and means for anchoring a free end of the wire forming the links of said chain against displacement under strain.

31. In a chain making mechanism, the combination of means for feeding lengths of wire, means for shaping a loop on said lengths of wire having an extension, and connecting said lengths of wire to form a chain, and means for bending the said extension across the wire of the chain and clinching it beneath the latter crosswise of the plane of the loop.

32. In a chain making mechanism, the combination of means for feeding lengths of wire, means for shaping each of said lengths of wire to form two-fold link members, means for forming a link-connecting element on said two-fold members having extensions, and connecting said link members to form a chain, and means for clinching said extensions over and beneath the chain.

33. The combination with wire feeding mechanism, of mechanism for forming a chain of links having cross arms, and means for effecting a shortened feed of wire at predetermined times whereby to effect the omission of the cross-arm on one or more links of the chain.

34. The combination with wire feeding mechanism, of mechanism for forming chains of links having cross-arms, and means for effecting successive shortened feeds of wire whereby to effect the omission of the cross-arms on a chain at predetermined periods.

35. In a machine for making wire link fabrics, the combination with mechanism for forming a link having a cross-arm, of means for looping the end of said cross-arm around a laterally adjacent link, and means for anchoring the free end of the wire beyond the loop thus formed against displacement under strain.

36. In a machine for making wire link fabrics, the combination with mechanism for forming rows of directly interlooped identical links, each link having a cross-arm and a laterally disposed loop, of means for looping the ends of the cross arms of one row through the lateral loops of an adjacent row to form a fabric.

37. In a machine for making wire fabric links, the combination with mechanism for forming the body portion of a link, of means for forming a terminal loop thereon, and means for forming a laterally disposed loop thereon adjacent and in plane at an angle to said terminal loop.

38. In a machine for making wire fabric links, the combination with mechanism for forming a straight body portion of a link, of means for forming a loop at one end of said body portion, and means for anchoring a free end portion of the wire beyond said loop to said body portion.

39. In a machine for making wire fabric links, the combination with mechanism for forming a straight body portion of a link, of means for forming a vertical loop at one end of said body portion, and means for anchoring said loop to said body portion in a direction crosswise of the plane of said loop.

40. In a machine for making wire fabric links, the combination with means for forming the body of a link, of means for projecting a length of wire across said body, and means for forming a loop on said body around said wire.

41. The combination with mechanism for forming a straight body portion of a wire fabric link, of means for forming a laterally extending loop on said body portion of the wire, and mechanism for anchoring the end portion of the wire beyond said loop to the body portion.

42. The combination with mechanism for forming a straight body portion of a wire fabric link, of means for forming a laterally extending loop on said body portion of the wire, mechanism for anchoring the end portion of the wire beyond said loop to the body portion, and mechanism for anchoring the other end portion of the wire to the body portion.

43. The combination with mechanism for forming a straight two-ply body portion of a wire fabric link, of mechanism for forming a loop on one end thereof, and means for bending an extension of the wire of which said loop is formed above and beneath said body portion.

44. The combination with mechanism for forming a straight two-ply body portion of a wire fabric link, of mechanism for forming a loop on one end thereof, and means for bending an extension of the wire of which said loop is formed across both plies of said body member above and beneath the latter.

45. In a wire link fabric machine, the combination of mechanism operating to bend the wire into the form of two-ply links having oppositely extending lateral eyes and cross-arms and simultaneously connect said links in chain form, and mechanism serving to loop the cross-arms of each chain through the lateral eyes of the previously formed chain.

46. In a wire link fabric machine, the combination of mechanism operating to bend the wire into the form of two-ply links having oppositely extending lateral eyes and cross-arms and simultaneously connect said links in chain form, mechanism serving to loop the cross-arms of each chain through the lateral eyes of the previously formed chain, and means for clinching the free ends of the wires forming the cross-arm loops to the cross-arms.

47. In a wire link fabric machine, the combination with chain forming mechanism, of mechanism for feeding the wire to said chain forming mechanism comprising wire-guiding means, a reciprocating carriage carrying a wire gripper, a wire cutter, and automatic means effecting a shortened stroke of said carriage when feeding stock for a terminal link of each chain.

48. In a wire link fabric machine, the combination with chain-forming and fabric assembling mechanisms, of mechanism for feeding the wire to said chain-forming mechanism comprising wire-guiding means, a reciprocating carriage carrying a wire gripper, a wire cutter, and automatic means effecting a shortened stroke of said carriage when feeding stock for the links of a marginal chain of the fabric.

49. In a wire link fabric machine, the combination with chain-forming and fabric assembling mechanisms, of mechanism for feeding the wire to said chain-forming mechanism comprising wire guiding means, a reciprocating carriage carrying a wire gripper, a wire cutter, and automatic means effecting a shortened stroke of said carriage when feeding stock for a terminal link of each chain and for the links of a marginal chain of the fabric.

50. In a wire link fabric machine, the combination with chain forming mechanism, of a wire feed mechanism comprising a reciprocating carriage, a spring-actuated wire gripping dog carried by said carriage, and automatic means for holding said dog out of engagement with the wire at predetermined intervals.

51. In a wire link fabric machine, the combination with wire feeding mechanism, of a combined link and chain forming mechanism comprising a channeled table, a plurality of link shaping devices located in spaced relation along and opposite the channel of said table and operating in succession upon the links after the latter have been moved from one to another of said link-shaping devices, and means for advancing the partially formed links in and lengthwise of said channel from the first to the last of said link shaping devices.

52. In a wire link fabric machine, the combination with wire feeding mechanism, of a combined link and chain forming mechanism comprising a channeled table, a plurality of link shaping devices located in spaced relation along and opposite the channel of said table and operating in succession upon the links after the latter have been moved from one to another of said link-shaping devices, and a series of pawls mounted to reciprocate above said channel and serving to advance the partially formed links by a step-by-step movement from the first to the last of said link shaping devices.

53. In a wire link fabric machine, the combination with wire feeding mechanism, of a combined link and chain forming mechanism comprising a channeled table, a plurality of link shaping devices located in spaced relation along and opposite the channel of said table and operating in succession upon the links after the latter have been moved from one to another of said link-shaping devices, a series of pawls mounted to reciprocate above said channel and serving to advance the partially formed links by a step-by-step movement from the first to the last of said link shaping devices, and another series of reciprocating pawls beyond said first-named series operating to advance the chain lengthwise of said channel.

54. In a wire link fabric machine, the combination with wire feeding mechanism, of a combined link and chain forming mechanism comprising a channeled table, a plurality of link shaping devices located in spaced relation along and opposite the channel of said table and operating in succession upon the links after the latter have been moved from one to another of said link-shaping devices, means for advancing the partially formed links by a step-by-step movement in and lengthwise of said channel from the first to the last of said link shaping devices, other means for advancing the completed portion of the chain by a step-by-step movement lengthwise of said channel beyond said link shaping devices, and means for holding the chain against movement in said channel between advance movements of said chain advancing means.

55. In a wire link fabric machine, the combination with a table having a chain-guiding groove, of means for feeding a straight section of wire across said groove, a link-forming member reciprocating lengthwise of said groove and operating to bend said wire upon itself, a loop-former operating to form a two-ply loop at the rear end of the link with an end portion of the wire upstanding, and means for bending down said upstanding end portion across the link to form a cross-arm.

56. In a wire link fabric machine, the combination with a table having a chain guiding groove, of means for feeding a straight section of wire across said groove, a link forming member reciprocating lengthwise of said groove and operating to bend said wire upon itself, a loop former operating to form a two-ply loop at the rear end of said link with an end portion of the wire upstanding, and a pivoted arm carrying a die-block adapted to swing transversely of said groove and bend down said upstanding end portion across the link to form a cross-arm.

57. In a wire link fabric machine, the combination with a table having a chain guiding groove, and means for feeding a straight section of wire across said groove, of means for bending said section into a link of hairpin form in said groove, mechanism located adjacent to said groove operating to form a two-ply depending loop on the rear end of said link and a laterally extending cross-arm formed by one end portion of the wire, means for advancing said link lengthwise of said groove, and mechanism located adjacent to said groove beyond said first-named mechanism operating to bend the other end portion of the wire into the form of an upstanding loop with its extreme end tucked beneath the body member of the link.

58. In a wire link fabric machine, the combination with a table having a chain guiding groove, and means for feeding a straight section of wire across said groove, of means for bending said section into a link of hairpin form in said groove, mechanism located adjacent to said groove operating to form a two-ply depending loop on the rear end of said link and a laterally extending cross-arm formed by one end portion of the wire, means for advancing said link lengthwise of said groove, mechanism located adjacent to said groove beyond said first-named mechanism operating to bend the other end portion of the wire into the form of an upstanding loop with its extreme end tucked beneath the body member of the link, means for further advancing said link lengthwise of said groove, and mechanism located adjacent to said groove beyond said last named mechanism operating to flatten down said upstanding loop crosswise of the body member of the link and to clinch said extreme end of the wire on said body member.

59. In a wire link fabric machine, a loop forming mechanism to operate upon an upstanding end portion of the wire of a link, comprising a wire-bending member mounted to oscillate about a horizontal axis, and a mandrel on which the wire is bent mounted eccentric to said axis, said mandrel having movement relative to said member about said axis.

60. In a wire link fabric machine, a loop forming mechanism to operate upon an upstanding end portion of the wire of a link, comprising a wire-bending member mounted to oscillate about a horizontal axis, means for oscillating said wire-bending member, a mandrel on which the wire is bent mounted eccentric to and capable of oscillating about said axis, and a lost motion driving connection between said wire-bending member and said mandrel.

61. In a wire link fabric machine, a loop-forming mechanism to operate upon an upstanding end portion of the wire of a link, comprising a sleeve mounted to oscillate on its longitudinal axis and having an eccentric wire-bending member on one end thereof, a core-piece mounted to oscillate in said sleeve and having an eccentric mandrel on the same end thereof, means for oscillating said sleeve, and a lost motion driving connection between said sleeve and said core-piece.

62. In a wire link fabric machine, a loop-forming mechanism to operate upon an upstanding end portion of the wire of a link, comprising a wire-bending member mounted to oscillate about a horizontal axis, a mandrel on which the wire is bent mounted eccentric to said axis, and means for bending the free end of the loop formed from said end portion of the wire beneath the body of the link.

63. In a wire link fabric machine, a loop-forming mechanism to operate upon an upstanding end portion of the wire of a link, comprising a wire-bending member mounted to oscillate about a horizontal axis, a mandrel on which the wire is bent mounted eccentric to said axis, and a member mounted to reciprocate transversely of the link and operating to bend the free end of the loop formed from said end portion of the wire beneath the body of the link.

64. In a wire link fabric machine, the combination with mechanism for producing a partially shaped link having an upstanding loop disposed lengthwise of one side of the link, of means for bending said loop to a substantially horizontal position wherein it projects laterally of the opposite side of the link.

65. In a wire link fabric machine, the combination with mechanism for producing a partially shaped link having an upstanding loop formed from a terminal portion of the wire of the link, of means for bending said loop crosswise of the body of the link to a position wherein it projects laterally of the latter, and means for clinching the free end of the wire forming said loop to the body of the link.

66. In a wire link fabric machine, the combination with mechanism for producing a partially shaped link having an upstanding loop formed from a terminal portion of the wire of the link, of a cam-actuated lever operating to bend said loop crosswise of the body of the link to a position wherein it projects laterally of the latter, and a reciprocatory wedge member operating to clinch the free end of the wire forming said loop beneath the body of the link.

67. In a wire link fabric machine, the combination with a support having parallel guides in one of which a chain of links is formed and advanced and in the other of which the chain is supported in position to be joined to a previously formed portion of the fabric, of chain forming mechanism cooperating with said forming guide, and means for transferring a chain laterally from said forming guide to said supporting guide.

68. In a wire link fabric machine, the combination with a table having parallel grooves in one of which a chain of links is formed and advanced and in the other of which the chain is supported in position to be joined to a previously formed portion of the fabric, of chain forming mechanism cooperating with said forming groove, and a series of transfer bars mounted to reciprocate transversely of said grooves and operating to engage a chain lying in said forming groove and shift the same laterally into said supporting groove.

69. In a wire link fabric machine, the combination with a table having parallel grooves in one of which a chain of links is formed and advanced and in the other of which the chain is supported in position to be joined to a previously formed portion of the fabric, of chain forming mechanism cooperating with said forming groove, means for transferring a chain laterally from said forming groove to said supporting groove, and means for holding the chain in the latter groove during the joining operation.

70. In a wire link fabric machine, the combination with a table having parallel grooves in one of which a chain of links is formed and advanced and in the other of which the chain is supported in position to be joined to a previously formed portion of the fabric, of chain forming mechanism cooperating with said forming groove, a series of transfer bars mounted to reciprocate transversely of said grooves and operating to engage a chain lying in said forming groove and shift the same laterally into said supporting groove, and a spring-pressed bar overlying said supporting groove and operating to hold the chain down in the latter during the joining operation.

71. In a wire link fabric machine, means for joining a chain of links having integral cross-arms to a previously formed chain of links having lateral loops, comprising means for passing the free end portions of said cross-arms through said loops, and a series of loop-formers operating to loop said free end portions around the body portions of said cross-arms.

72. In a wire link fabric machine, means for joining a chain of links having integral cross-arms to a previously formed chain of links having lateral loops, comprising means for passing the free end portions of said cross-arms through said loops, a series of loop-formers operating to loop said free end portions around the body portions of said cross-arms thereby producing terminal cross-arm loops loosely articulated to said lateral loops, and means for clinching the ends of the wires forming said terminal loops on the body portions of said cross-arms.

73. In a wire link fabric machine, means for laterally joining chains of wire links having integral cross-arms and loops on opposite sides thereof, respectively, to build up the fabric, comprising parallel relatively movable holders for two adjacent chains, means for bending the terminal portions of the cross-arms of one chain, means for guiding said bent portions of the cross-arms through the loops of the other chain, and means for looping said bent portions around their respective cross-arms.

74. In a wire link fabric machine, means for laterally joining chains of wire links having integral cross-arms and loops on opposite sides thereof, respectively, to build up the fabric, comprising parallel relatively movable holders for two adjacent chains, means for bending the terminal portions of the cross-arms of one chain, means for guiding said bent portions of the cross-arms through the loops of the other chain, means for looping said bent portions around their respective cross-arms, and a series of pinchers operating to clinch the ends of said bent portions on their respective cross-arms.

75. In a wire link fabric machine, means for laterally joining chains of wire links having integral cross-arms and loops on opposite sides thereof, respectively, to build up the fabric, including a series of anvils, means for holding a chain with the cross-arms thereof extending across said anvils, and means for bending down the overhanging terminal portions of said cross-arms substantially at right-angles to the body portions thereof.

76. In a wire link fabric machine, means for laterally joining chains of wire links having integral cross-arms and loops on opposite sides thereof, respectively, to build up the fabric, including a series of anvils, means for holding a chain with the cross-arms thereof extending across said anvils, a rock-shaft, and a series of arms on said rock-shaft operating to bend down the overhanging terminal portions of said cross-arms substantially at right-angles to the body portions thereof.

77. In a wire link fabric machine, means for laterally joining chains of wire links having integral cross-arms and loops on opposite sides thereof, respectively, to build up the fabric, including a series of anvils, means for holding one chain with the cross-arms thereof extending across said anvils, means for bending down the overhanging terminal portions of said cross-arms, and a movable holder for the other chain operative to carry the loops thereof over the depending terminal portions of said cross-arms.

78. In a wire link fabric machine, means for laterally joining chains of wire links having integral cross-arms and loops on opposite sides thereof, respectively, to build up the fabric, including a series of anvils, means for holding one chain with the cross-arms thereof extending across said anvils, means for bending down the overhanging terminal portions of said cross-arms, a movable holder for the other chain operative to carry the loops thereof over the depending terminal portions of said cross-arms, and a series of guides serving to center and direct said depending portions through said loops.

79. In a wire link fabric machine, means for laterally joining chains of wire links having integral cross-arms and loops on opposite sides thereof, respectively, to build up the fabric, comprising a series of anvils, means for holding one chain with the cross-arms thereof extending across said anvils, means for bending down the terminal portions of said cross-arms, a movable holder for the other chain operative to carry the loops thereof over the depending terminal portions of said cross-arms, a series of guides serving to center and direct said depending portions through said loops, and a series of loop-formers operative to loop said depending portions around the body portions of said cross-arms.

80. In a wire link fabric machine, means for laterally joining chains of wire links having integral cross-arms and loops on opposite sides thereof, respectively, to build up the fabric, comprising a series of anvils, means for holding one chain with the cross-arms thereof extending across said anvils, means for bending down the terminal portions of said cross-arms, a movable holder for the other chain operative to carry the loops thereof over the depending terminal portions of said cross-arms, a series of guides serving to center and direct said depending portions through said loops, a series of loop-formers operative to loop said depending portions around the body portions of said cross-arms, and means for clinching the free ends of said depending portions on said body portions.

81. In a wire link fabric machine, the combination with mechanism for forming chain of interlooped identical links, of means for disposing said chain in parallel lengths, means for connecting adjacent parallel lengths, and means for shifting the completed portion of the fabric between successive operations of said chain-connecting mechanism.

82. In a wire link fabric machine, the combination with mechanism for laterally joining successively formed chains of wire links to build up the fabric, of a movable holder for a chain, and a series of chain gripping devices mounted to reciprocate transversely of said holder and operating to remove the chain therefrom to the extent of the distance between adjacent chains between successive operations of said chain-joining mechanism.

83. In a wire link fabric machine, the combination with a movable holder for a chain, and a support for a chain of wire links carrying cross-connecting members to be added to a chain on said holder, of chain-joining mechanism between said holder and support including a series of mandrels and a series of loop-formers co-operating with said mandrels to interloop the ends of said cross-connecting members with the chain on said holder.

84. In a wire link fabric machine, the combination with a movable holder for a chain, and a support for a chain of wire links carrying cross-connecting members to be added to a chain on said holder, of chain-joining mechanism between said holder and support including a series of mandrels and a series of loop-formers cooperating with said mandrels to interloop the ends of said cross-connecting members with the chain on said holder, and means for dislodging the looped ends of said cross-connecting members from said mandrels.

85. In a wire link fabric machine, the combination with a movable holder for a chain, and a support for a chain of wire links carrying cross-connecting members to be added to a chain on said holder, of chain-joining mechanism between said holder and support including a series of mandrels and a series of loop-formers cooperating with said mandrels to interloop the ends of said cross-connecting members with the chain on said holder, means for dislodging the looped ends of said cross-connecting members from said mandrels, and means for removing the chain from said holder to the extent of the distance between adjacent chains between successive operations of said chain-joining mechanism.

86. In a fabric assembling mechanism, the combination of a movable holder for a chain, a support for a chain and chain-connecting member to be added to the chain on said holder, and chain-joining mechanism, including a mandrel and an oscillating loop-former cooperating with said mandrel, said chain-joining mechanism operating to join an end of said chain-connecting member to the chain on said holder.

87. In a fabric assembling mechanism, the combination of a movable holder for a chain, a support for a chain and chain-connecting member to be added to the chain on said holder, chain-joining mechanism, including a mandrel and an oscillating loop-former cooperating with said mandrel, said chain-joining mechanism operating to join an end of said chain connecting member to the chain on said holder, and a clamp to hold said cross-connecting member in position to be joined.

88. The combination of a movable holder for a chain, means for disposing a succession of unconnected chains, one at a time, parallel to the chain on said holder, chain joining mechanism operating to both connect and secure a chain on said holder to a succeeding parallel chain, and means for removing a chain from the said holder and transferring a succeeding chain thereto between successive operations of the said chain-joining mechanism.

89. The combination of mechanism for forming a succession of unconnected chains, a movable holder for a chain, chain-joining mechanism operating to both connect and directly secure the chain on said holder to a succeeding chain to form a finished fabric portion, and means for removing a chain from the said holder and transferring a succeeding parallel chain thereto previous to a succeeding operation of the chain-joining mechanism.

90. The combination of a movable holder for a chain, means for disposing successive chains parallel to a chain on the said holder, chain-joining mechanism operating to both connect and secure the links of a chain on the holder to the links of a parallel chain, and means for shifting the fabric portion so formed to the extent of the distance between parallel chains between successive operations of the said chain-joining mechanism.

91. The combination of a movable holder for a chain, means for disposing successive unconnected chains parallel to the chain on said holder, chain-joining mechanism, including a mandrel and an oscillating loop former, operating to both connect and secure the links of a chain on said holder to the links of a parallel chain, and means for shifting the finished fabric portion so formed to the extent of the distance between parallel chains between successive operations of said chain-joining mechanism.

92. In a wire link making machine, the combination of means for severing unequal sections of wire from a single continuous length of wire, means for feeding said unequal sections of wire to the link forming mechanism, and means for forming said unequal sections of wire into links of variform shapes.

93. In a wire link chain-making mechanism, the combination of means for severing unequal lengths of wire from a single continuous length of wire, means for feeding said unequal lengths of wire to the link forming mechanism, means for predetermining the order in which said unequal lengths of wire are fed, and means for shaping and connecting said unequal lengths of wire to constitute the variform links of a chain.

94. In a machine for assembling unconnected wire-link fabrics of a definite size, the combination of mechanism for feeding separate chains of a fixed length, mechanism for connecting said chains laterally to one another, and means for predetermining the number of said chains in each unconnected fabric.

95. In a machine for making unconnected wire link fabrics of a definite size, the combination of mechanism for shaping and connecting links to form chain, means for disposing said chain in parallel lengths, means for predetermining the number of links in each parallel length, means for connecting said parallel lengths laterally to one another, and means for predetermining the number of said parallel lengths in each unconnected fabric.

96. In a chain making machine, the combination of mechanism for feeding lengths of wire, mechanism for shaping one of said lengths into link form and connecting a succeeding length thereto, and a plurality of link-shaping devices having a spaced relation with said link shaping and connecting means operating to shape said last-named length of wire into link form following its connection with said first-named length.

97. In a chain-making machine, the combination of mechanism for feeding lengths of wire, mechanism for shaping said lengths of wire into partly formed links, means for connecting said links to form a chain, other link shaping mechanism having a spaced relation to the said connecting means, and operating to complete the formation of the said links after their connection into chain form, and mechanism for advancing the said chain of partly formed links step by step from the said connecting means to the said last-named link-shaping mechanism.

98. In a machine for making wire fabric chain, the combination of link and chain forming means, including mechanism for feeding and shaping lengths of wire to constitute partly formed links each comprising a substantially straight body member, mechanism for shaping link connecting elements on the said links, and uniting the latter to form a chain, and mechanism for clinching a free end extension of a link connecting element of the said links around a body member of a link whereby the said link-connecting elements are secured against opening out or creeping lengthwise under strain.

99. In a machine for making wire fabric chain, the combination of link and chain forming means, including mechanism for feeding lengths of wire, mechanism for shaping said lengths of wire to constitute partly formed links each comprising a pair of substantially straight body members, mechanism for shaping a pair of link-connecting elements between the ends of the said body members and uniting the said elements of one link with an end of an adjacent link to form a chain, and mechanism for clinching a free end extension of one of said link-connecting elements over and beneath a body member of a link.

100. In a machine for making wire fabric chain, the combination of link and chain forming means, including mechanism for feeding lengths of wire, mechanism for shaping and connecting said lengths of wire to form a chain of links each comprising a straight body portion and a closed loop disposed in the plane of the fabric, and mechanism for clinching a free end portion of the wire beyond the said loop around the said body portion of the link.

101. In a machine for making fabric chain, the combination of link and chain forming means, including mechanism for feeding lengths of wire, mechanism for shaping and connecting said lengths of wire to form a chain of links each comprising a pair of substantially straight body members, and a closed loop disposed in the plane of the fabric, and mechanism for clinching a free end portion of the wire of the said links over and beneath a body member.

102. In a machine for making wire fabric chain, the combination of link and chain forming means, including mechanism for feeding lengths of wire, mechanism for shaping said lengths of wire to constitute partly formed links each comprising a two-ply body member, mechanism for shaping a two-ply link connecting element on one end of the said links and uniting the said two-ply element of one link with the opposite end of an adjacent link to form a chain, mechanism for forming a closed loop disposed in the plane of the fabric on the said links, and mechanism for clinching a free end portion of the wire of the said links over and beneath a said body member.

103. In a machine for making wire link fabric chain, the combination of link and chain forming means, including mechanism for feeding lengths of wire, mechanism for folding said lengths of wire to constitute partly formed links, each comprising a two-ply body member, and means operating to form a link-connecting element on said links and connect them in chain form, and to shape a free end extension of said link connecting element to form a closed loop disposed laterally of said body member.

104. In a machine for making wire link fabric chain, the combination of link and chain forming means, including mechanism for feeding lengths of wire, mechanism for folding said lengths of wire to constitute partly formed links each comprising a pair of body members, mechanism for shaping a pair of link-connecting elements on one end of the said links and uniting the said pair of elements of one link with the opposite end of an adjacent link to form a chain, mechanism for shaping a free end extension of one of the said link connecting elements to form a closed loop disposed laterally of the body member of said link, and mechanism for clinching the terminal portion of said extension to said body member of a link.

105. In a machine for making wire link fabric chain, the combination of link and chain forming means, including means for feeding lengths of wire, means for shaping and connecting said lengths of wire to form a chain of links each comprising a pair of body members and link-connecting elements, and mechanism for shaping a free end extension of one of the said link-connecting elements to form a closed loop on the said link disposed laterally of the said body member and between the ends of the latter.

106. In a machine for making wire link fabric chain, the combination of link and chain forming means, including mechanism for feeding lengths of wire, mechanism for shaping said lengths of wire to constitute partly formed links each comprising a pair of body members, mechanism for shaping link-connecting elements on one end of the said links and uniting the said elements of one link with the opposite end of an adjacent link to form a chain, mechanism for bending a free end extension of one of the said link-connecting elements, following its connection with an adjacent link, to form a closed laterally disposed loop on the said link, and mechanism for clinching the terminal portions of the said extensions to the said body members of the links.

107. In a chain-making machine, the combination of means for folding a length of wire upon itself, means for feeding a second length of wire across said folded length, and means for looping one end of said folded length around said second length of wire.

108. In a chain-making machine, the combination of means for folding a length of wire upon itself, means for feeding a second length of wire across said folded length, means for bending a terminal loop on said folded length around said second length, and means for anchoring a free end extension of said terminal loop to said folded length of wire.

109. In a machine for assembling wire link chain to form fabric, the combination of two parallel supports each carrying a chain of wire links, mechanism operating to pass an end portion of chain connectors through the links of one of the said chains, mechanism, including a mandrel and an oscillating wire former, co-operating with the said mandrel for shaping and closing said end portions around the said links, and mechanism for moving the fabric portion so formed between the connecting on of successive chains to the said fabric portion.

110. In a machine for assembling wire link chain to form fabric, the combination of two parallel supports each carrying a chain of wire links, mechanism for passing an end portion of chain connectors through the links of one of said chains to connect said chains to one another, mechanism, including a mandrel and a wire former, co-operating with the said mandrel, operating to close the connections so made to constitute a fabric portion, and mechanism for moving the said fabric portion between the connecting on of successive chains to the said fabric portion.

111. In a fabric assembling mechanism, the combination of means for uniting chain to form fabric, including a movable holder for a chain, a support carrying another chain to be added to the chain on the said holder, mechanism having co-acting parts operating to connect elements of the links of the chains on said holder and support directly with one another and immediately close the connections so made to constitute a finished fabric portion, and mechanism for removing the chain from the said movable holder and transferring the chain on said support to said movable holder before the connecting on of each successive chain to the said finished fabric portion.

112. In a fabric assembling mechanism, the combination of two parallel supports each carrying a chain of wire links, mechanism for shaping end portions of straight chain connectors into closed engagement with the links of one of said chains to connect said chains to one another, and mechanism for moving the fabric portion so formed between the connecting on of successive chains to the said fabric portion.

113. In a fabric assembling mechanism, the combination of means for uniting chain to form fabric, including mechanism for feeding unconnected chains, mechanism for disposing the said chains in parallel lengths, and mechanism having co-acting parts operating to connect elements of the links of one parallel length directly with elements of the links of an adjacent parallel length, and immediately close the connection so formed to constitute finished fabric.

114. In a machine for assembling wire link chain to form fabric, the combination of two parallel holders each carrying a chain of links, mechanism for passing end portions of chain connectors through the links of one of the said chains to connect said chains to one another, and mechanism, including a mandrel and a wire former co-operating with the said mandrel, for shaping the said end portions to form closed connections with the said links.

115. In a machine for assembling wire link chain to form fabric, the combination of parallel supports each carrying a chain of links, mechanism for applying chain connectors between the links of adjacent chains, and mechanism for clinching free end portions of said chain connectors to the body portions of the latter to prevent separation of the chains when under strain.

ANTHONY RHENSTROM.
ORLA H. WATKINS.